US012764176B2

(12) United States Patent
Forrest et al.

(10) Patent No.: US 12,764,176 B2
(45) Date of Patent: Oct. 13, 2026

(54) STREAMING NETWORK TOPOLOGY

(71) Applicant: SimpliSafe, Inc., Boston, MA (US)

(72) Inventors: Justin Forrest, Boston, MA (US); Alan Willard, Norton, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/202,449

(22) Filed: May 8, 2025

(65) Prior Publication Data

US 2026/0012498 A1 Jan. 8, 2026

Related U.S. Application Data

(60) Provisional application No. 63/667,974, filed on Jul. 5, 2024.

(51) Int. Cl.

| | |
|---|---|
| ***G06F 15/16*** | (2006.01) |
| ***G06F 3/16*** | (2006.01) |
| ***H04L 65/65*** | (2022.01) |
| ***H04N 23/661*** | (2023.01) |

(52) U.S. Cl.

CPC .............. *H04L 65/65* (2022.05); *G06F 3/165* (2013.01); *H04N 23/661* (2023.01)

(58) Field of Classification Search

CPC ........ H04L 65/65; H04N 23/661; G06F 3/165

See application file for complete search history.

(56) References Cited

U.S. PATENT DOCUMENTS

| | | | |
|---|---|---|---|
| 10,380,854 B1 | 8/2019 | Yu | |
| 10,764,442 B1 | 9/2020 | Delaney et al. | |
| 10,942,992 B2 | 3/2021 | Uzelac et al. | |
| 11,343,293 B1 * | 5/2022 | Slotznick | H04N 5/272 |
| 11,563,855 B1 | 1/2023 | Spivak et al. | |
| 11,792,455 B1 | 10/2023 | Fu et al. | |
| 11,924,256 B2 | 3/2024 | Wang | |
| 2005/0259694 A1 * | 11/2005 | Garudadri | H04L 69/04 370/352 |
| 2006/0265262 A1 | 11/2006 | Kamdar et al. | |
| 2007/0050451 A1 | 3/2007 | Caspi et al. | |
| 2011/0137438 A1 * | 6/2011 | Zhang | H04N 7/15 709/224 |

(Continued)

OTHER PUBLICATIONS

Kikuchi, Yusuke, et al., "Mobile Cross Reality (XR) space for remote collaboration", AHFE Open Access, 2022, Human Factors in Virtual Environments and Game Design, vol. 50, pp. 25-31. USA.http://doi.org/10.54941/ahfe1002057.

(Continued)

*Primary Examiner* — Duyen M Doan

(74) *Attorney, Agent, or Firm* — Secant IP, P.L.L.C.

(57) ABSTRACT

A computer implemented method includes initiating, by at least one processor within a computing environment, operation of a virtual camera and an SFU; receiving, by the SFU, a plurality of audio streams from a plurality of remote devices; communicating, by the SFU, the plurality of audio streams to the virtual camera; receiving, by the virtual camera, the plurality of audio streams from the SFU; mixing, by the virtual camera, the plurality of audio streams into a single audio stream; communicating, by the virtual camera, the single audio stream to a physical image capture device; and receiving, by the virtual camera, an audiovisual stream from the physical image capture device.

20 Claims, 19 Drawing Sheets

(56) References Cited

U.S. PATENT DOCUMENTS

| | | | | |
|---|---|---|---|---|
| 2013/0109365 | A1 | 5/2013 | Buzdugan | |
| 2013/0165171 | A1 | 6/2013 | Pai et al. | |
| 2014/0142951 | A1* | 5/2014 | Crawley | H04L 12/1822 704/275 |
| 2016/0065898 | A1* | 3/2016 | Lee | H04N 7/152 348/14.09 |
| 2016/0337302 | A1 | 11/2016 | Ko et al. | |
| 2017/0094457 | A1 | 3/2017 | Lee | |
| 2019/0075171 | A1 | 3/2019 | Childress et al. | |
| 2020/0171394 | A1 | 6/2020 | Khan et al. | |
| 2020/0280702 | A1 | 9/2020 | Singh et al. | |
| 2021/0026019 | A1 | 1/2021 | Gahagan et al. | |
| 2021/0120051 | A1* | 4/2021 | Klaghofer | H04L 65/403 |
| 2022/0086203 | A1* | 3/2022 | Morris | H04N 7/157 |
| 2022/0109758 | A1* | 4/2022 | Abhishek | H04L 65/403 |
| 2023/0036647 | A1 | 2/2023 | La Barrie et al. | |
| 2024/0179191 | A1 | 5/2024 | Yerli | |
| 2024/0179354 | A1 | 5/2024 | Yerli | |
| 2024/0214436 | A1 | 6/2024 | Escoda et al. | |
| 2024/0256693 | A1 | 8/2024 | Wong et al. | |
| 2025/0008301 | A1 | 1/2025 | Karthik et al. | |
| 2025/0023936 | A1* | 1/2025 | Li | H04L 67/131 |
| 2025/0218125 | A1* | 7/2025 | Yamazoe | G06F 3/011 |

OTHER PUBLICATIONS

International Search Report and Written Opinion received in International Patent Application No. PCT/US2025/036277, mailed Nov. 3, 2025, 10 pages.

* cited by examiner

STREAMING NETWORK TOPOLOGY

CROSS-REFERENCE TO RELATED APPLICATIONS

This application claims priority under 35 U.S.C. § 119(e) to U.S. Provisional Application No. 63/667,974 titled "STREAMING NETWORK TOPOLOGY" and filed on Jul. 5, 2024, which is hereby incorporated herein by reference in its entirety.

TECHNICAL FIELD

Aspects of the technologies described herein relate to computing systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

In at least one example, a method is provided. The method includes initiating, by at least one processor within a cloud computing environment, operation of a virtual camera and a selective forwarding unit (SFU); receiving, by the SFU, a plurality of audio streams from a plurality of remote devices; communicating, by the SFU, the plurality of audio streams to the virtual camera; receiving, by the virtual camera, the plurality of audio streams from the SFU; mixing, by the virtual camera, the plurality of audio streams into a single audio stream; communicating, by the virtual camera, the single audio stream to an image capture device; and receiving, by the virtual camera, an audiovisual stream from the image capture device.

Examples of the method can incorporate one or more of the following features.

The method can further include communicating, by the virtual camera, the audiovisual stream to the SFU; receiving, by the SFU, the audiovisual stream from the virtual camera; and communicating, by the SFU, the audiovisual stream to the plurality of remote devices.

In the method, receiving the plurality of audio streams may include receiving a first plurality of real-time protocol (RTP) packets. Communicating the single audio stream may include communicating a second plurality of RTP packets. Receiving the audiovisual stream may include receiving a third plurality of RTP packets.

The method can further include receiving, by at least one processor, a request to establish a communication session between the image capture device and at least one remote device of the plurality of remote devices. Initiating operation of the virtual camera and the SFU can comprise initiating operation of the virtual camera and the SFU in response to receiving the request.

In the method, the plurality of audio streams may include a plurality of audio tracks. Mixing, by the virtual camera, the plurality of audio streams into a single audio stream may include implementing an audio processing pipeline comprising a mixer, generating a muted audio track, communicating the muted audio track to the mixer, and communicating the plurality of audio tracks to the mixer subsequent to communication of the muted audio track to the mixer. Mixing, by the virtual camera, the plurality of audio streams into a single audio stream can include implementing an audio processing pipeline comprising a mixer and communicating the plurality of audio tracks to the mixer.

The method can further include establishing, by the SFU, a virtual room for the communication session, and joining, by the virtual camera, the virtual room on behalf of the image capture device.

The method can further include acquiring, by the image capture device, the audiovisual stream; transmitting, by the image capture device, the audiovisual stream to the virtual camera; receiving, by the image capture device, the single audio stream; and rendering, by the image capture device, the single audio stream as audio.

The method can further include joining, by at least one remote device of the plurality of remote devices, the virtual room; acquiring, by the at least one remote device of the plurality of remote devices, at least one audio stream of the plurality of audio streams; transmitting, by the at least one remote device of the plurality of remote devices, the at least one audio stream to the virtual room; receiving, by the at least one remote device of the plurality of remote devices, at least one other audio stream of the plurality of audio streams; receiving, by the at least one remote device of the plurality of remote devices, the audiovisual stream; mixing, by the at least one remote device of the plurality of remote devices, audio tracks encapsulated within the at least one other audio stream and the audiovisual stream to generate a mixed track; and rendering, by the at least one remote device of the plurality of remote devices, the mixed track in lip synchrony with video encapsulated within the audiovisual stream.

The method can include hosting, by one or more of the computing devices, one or more of a customer interface or a monitor interface.

In the method, communicating the single audio stream may include communicating the single audio stream to a security camera.

In another example, a system is provided. The system includes a cloud computing environment comprising at least one network interface and at least one processor coupled with the at least one network interface. The at least one processor is configured to initiate operation of a virtual camera and a selective forwarding unit (SFU). The virtual camera is configured to receive a plurality of audio streams from the SFU, mix the plurality of audio streams into a single audio stream, communicate the single audio stream to an image capture device, and receive an audiovisual stream from the image capture device.

Examples of the system can incorporate one or more of the following features.

In the system, the virtual camera can be configured to communicate the audiovisual stream to the SFU. The SFU can be configured to receive the audiovisual stream from the virtual camera, communicate the audiovisual stream to a plurality of remote devices, receive the plurality of audio streams from the plurality of remote devices, and communicate the plurality of audio streams to the virtual camera.

In the system, the individual streams of the plurality of audio streams, the single audio stream, and the audiovisual stream may include real-time protocol (RTP) packets.

In the system, the at least one processor can be configured to initiate operation of the virtual camera and the SFU in response to reception of a request to establish a communication session between the image capture device and at least one remote device of the plurality of remote devices.

In the system, the plurality of audio streams may include a plurality of audio tracks. To mix the plurality of audio streams may include to implement an audio processing pipeline comprising a mixer; generate a muted audio track; communicate the muted audio track to the mixer; and communicate the plurality of audio tracks to the mixer subsequent to communication of the muted audio track to the mixer. To mix the plurality of audio streams may include to implement an audio processing pipeline comprising a mixer and communicate the plurality of audio tracks to the mixer.

In the system, the SFU can be further configured to establish a virtual room for the communication session. The virtual camera can be configured to join the virtual room on behalf of the image capture device.

The system can include an image capture device. The image capture device can be configured to acquire the audiovisual stream, transmit the audiovisual stream to the virtual camera, receive the single audio stream, and render the single audio stream as audio.

The system can include a plurality of remote devices. In the system, at least one remote device of the plurality of remote devices can be configured to join the virtual room, acquire at least one audio stream of the plurality of audio streams, transmit the at least one audio stream to the virtual room, receive at least one other audio stream of the plurality of audio streams, receive the audiovisual stream, mix audio tracks encapsulated within the at least one other audio stream and the audiovisual stream to generate a mixed track, and render the mixed track in lip synchrony with video encapsulated within the audiovisual stream.

The plurality of remote devices may include one or more computing devices configured to host one or more of a customer interface or a monitor interface. The image capture device may include a security camera.

In another example, one or more non-transitory computer readable media are provided. The computer readable media store sequences of instructions executable by one or more processors to implement a streaming network topology. The sequences of instructions include instructions to initiate operation of a virtual camera and a selective forwarding unit (SFU) and, the virtual camera being configured to receive a plurality of audio streams from the SFU, mix the plurality of audio streams into a single audio stream, communicate the single audio stream to an image capture device, and receive an audiovisual stream from the image capture device.

Examples of the computer readable media can incorporate instructions configured to execute any of the operations of the method or system described above.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIGS. 11B and 12 are a flow diagram illustrating other data processing pipelines, according to some examples disclosed herein.

DETAILED DESCRIPTION

Figure 1:
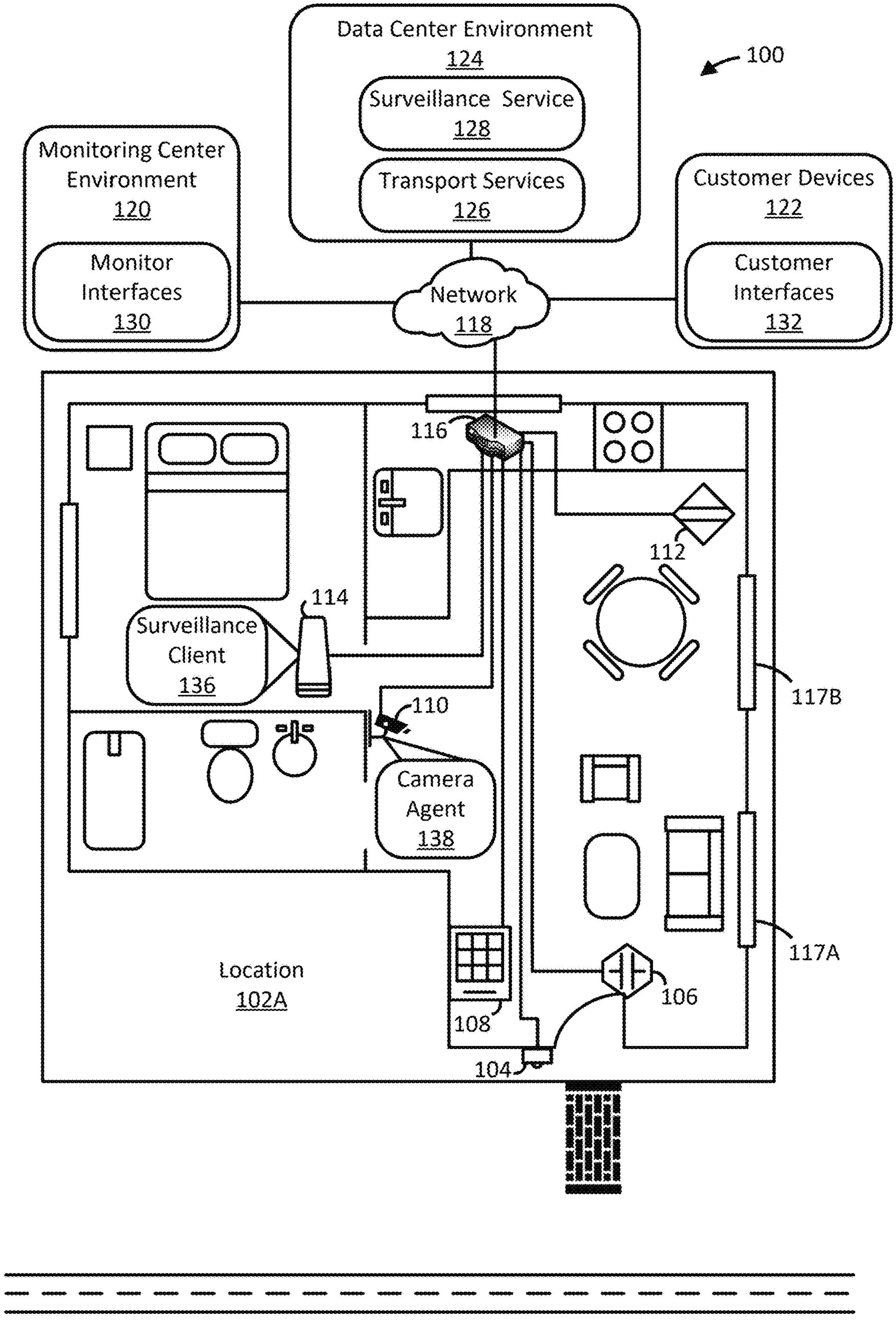
FIG. 1 is a schematic diagram of a security system, according to some examples described herein.

A s summarized above, at least some examples disclosed herein are directed to systems and processes that utilize a virtual device (e.g., a virtual camera) within a streaming topology to advantageous effect. In some examples, the virtual device operates as a cloud-based proxy for a physical device (e.g., a camera) located at a monitored location. Due to its implementation within the cloud, the virtual device has access to computational, storage, and network resources with capacities that far exceed those available to the physical devices (e.g., a security camera). Access to these resources, in turn, allows the architectural combination of the virtual device and the physical device to execute computationally complex and/or time sensitive processes at a level of service (e.g., in real-time) that the physical device would be unable to achieve alone. Further, the results of these computationally complex processes can be made available to the physical device (e.g., via a connection between the virtual camera and the physical camera) to enhance the experience of users of the physical device. One example of a computationally complex and time sensitive process for which the user experience can be enhanced through use of the virtual device is processing of multiple audio tracks within an interactive (e.g., real-time) communication session involving multiple participants. This example is described in detail below.

The technology described herein solves various problems that arise when executing processes with high computational load on resource constrained devices, such as security cameras, home automation devices, and internet of things (IoT) devices, among other devices. For example, within the context of security cameras that are configured to participate in interactive communication sessions, the introduction of a virtual device into a streaming topology supporting the sessions can decrease the computational load and power consumption placed on the physical security camera. This is especially true where the interactive communication session involves multiple devices in addition to the security camera. In this example, the virtual device manages multiple audio tracks from participants joining and leaving the interactive communication session. The physical security camera is required only to manage a single audio track during a conference room-like experience where multiple users could be talking at once. Due to this decrease in computational load, the physical security camera consumes less power, which may be of particular importance to battery powered security cameras, and renders the single audio track more cleanly (e.g., without delay, jitter, or other audio artifacts that can degrade a user's experience).

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (e.g., as described below with reference to FIG. 14). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g., via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132. It should be noted that data stored within any of the data stores disclosed herein may be stored by value or by reference (e.g., via an pointer, address, or other identifier of the data or the data's location).

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIM PLISA FE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figure 2:
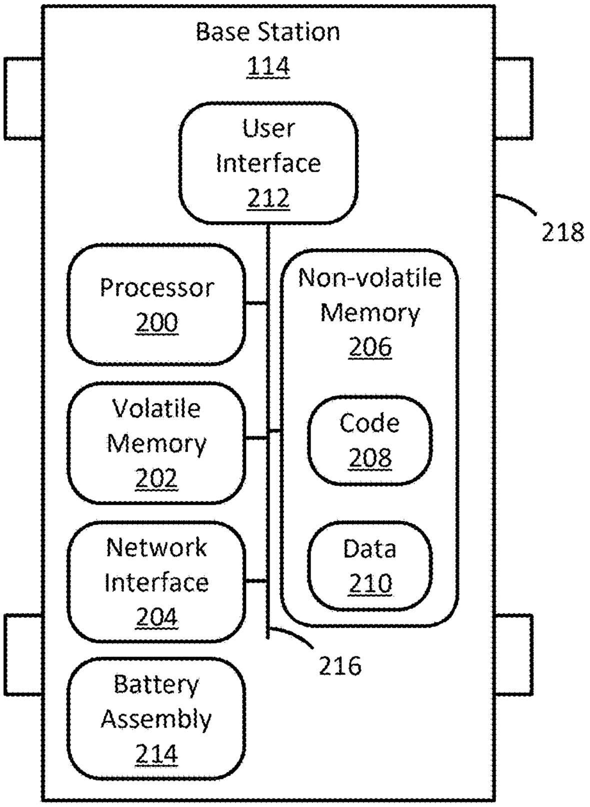
FIG. 2 is a schematic diagram of a base station, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (A SICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g., memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more Nickel-metal hydride (NIM H) or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert A C line power to DC device and recharging power.

Figure 3:
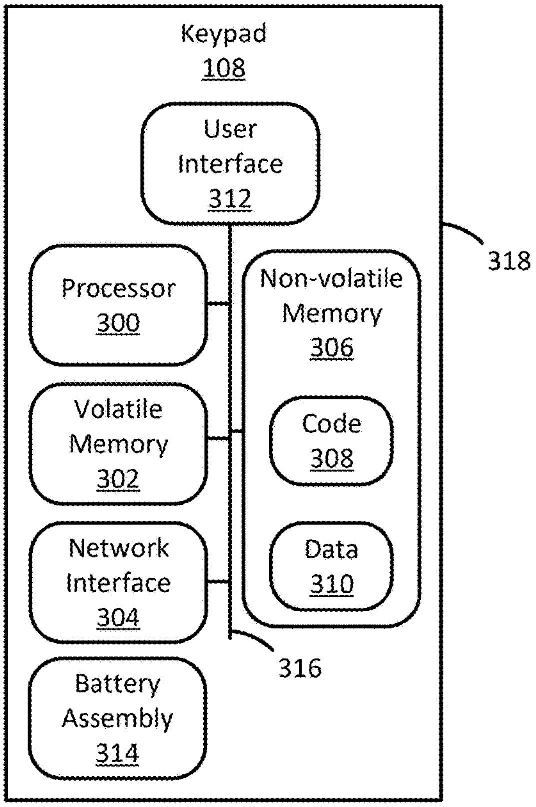
FIG. 3 is a schematic diagram of a keypad, according to some examples described herein.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
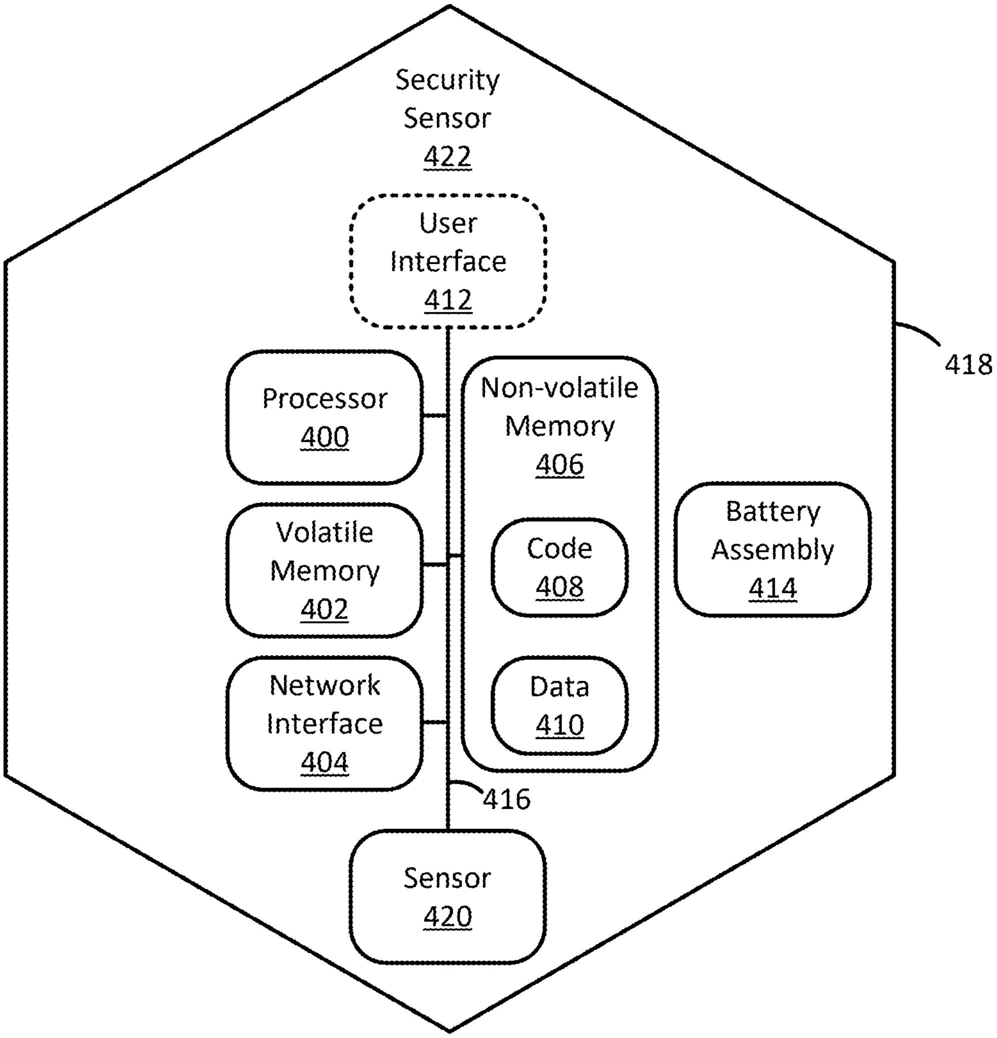
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
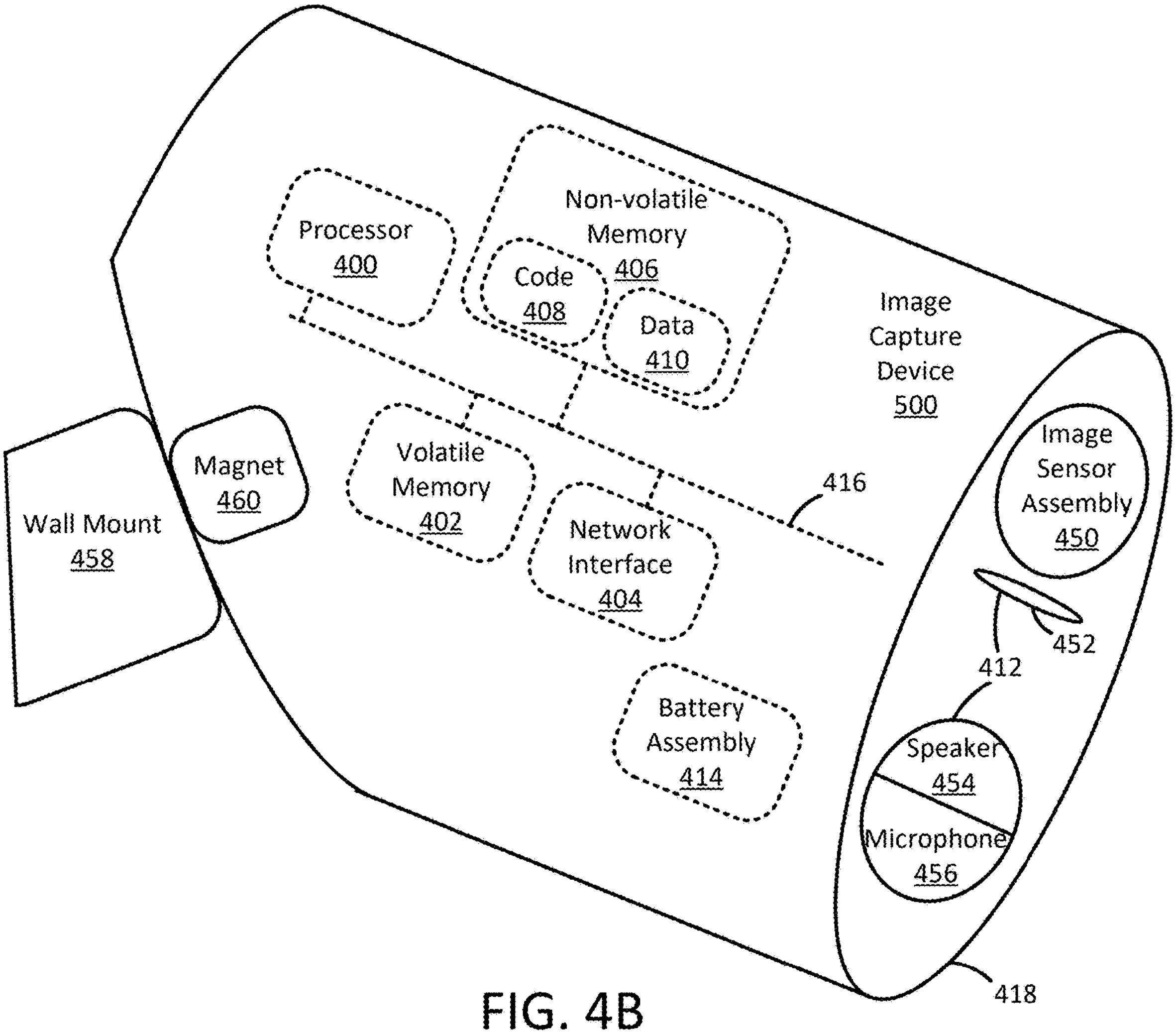
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEM S) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128, or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
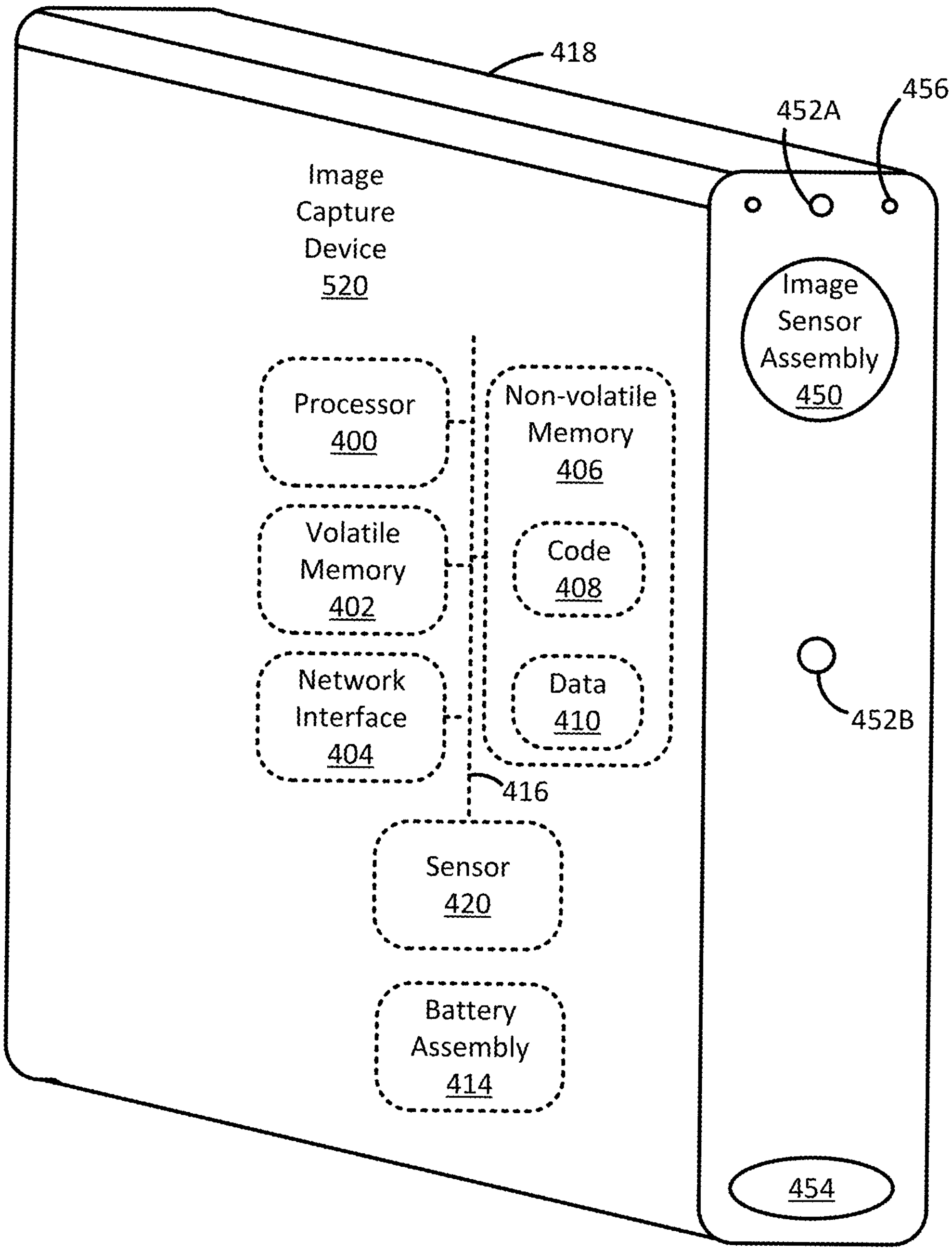
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and/or 452B, the speaker 454, and the microphone 456 implement an instance of the user interface 412 of FIG. 4A. It should also be appreciated that the image sensor assembly 450 and the lights 452A and/or 452B implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
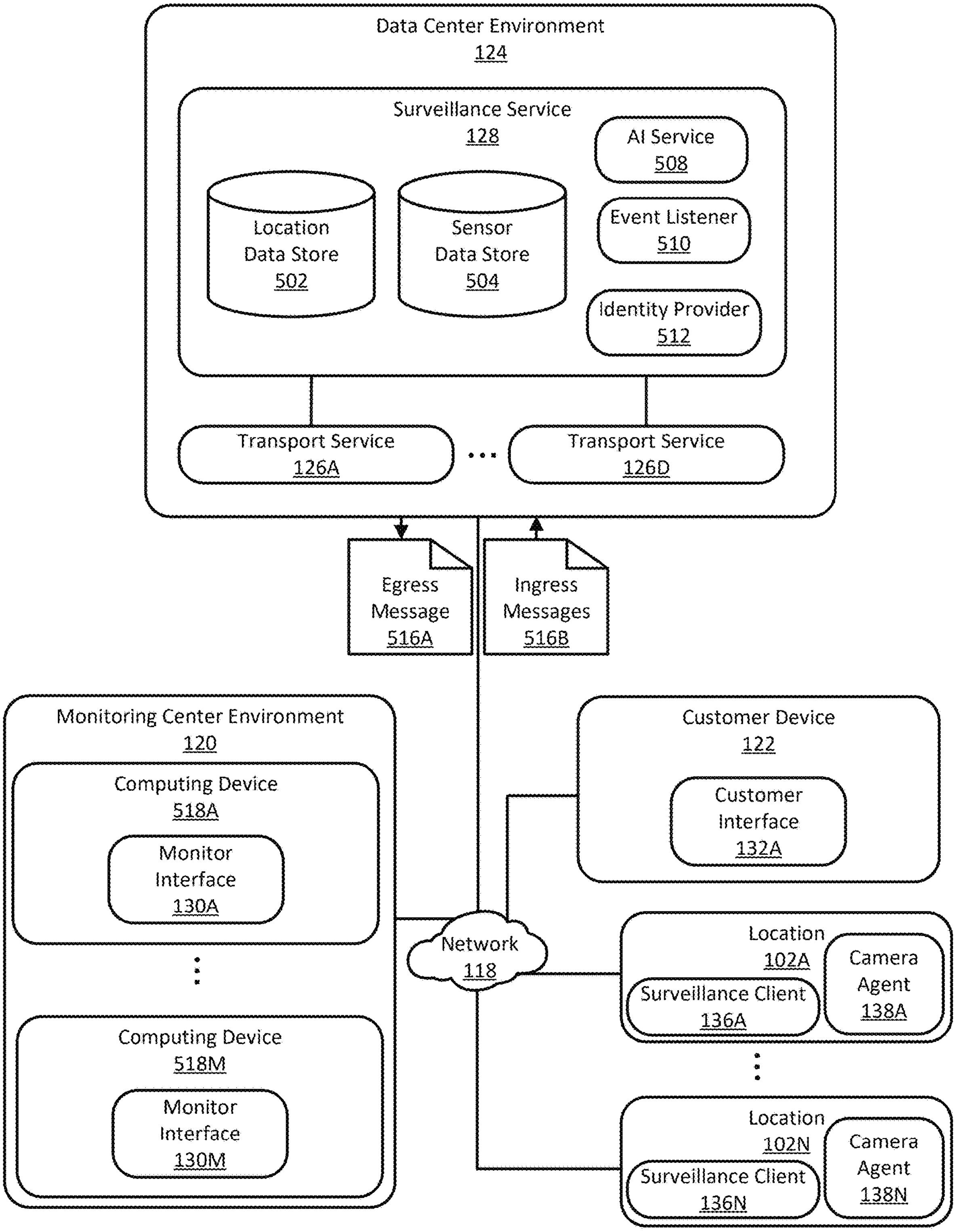
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers (e.g., user account identifiers) for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be used, for example, where the sensor data housed therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GU Is including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
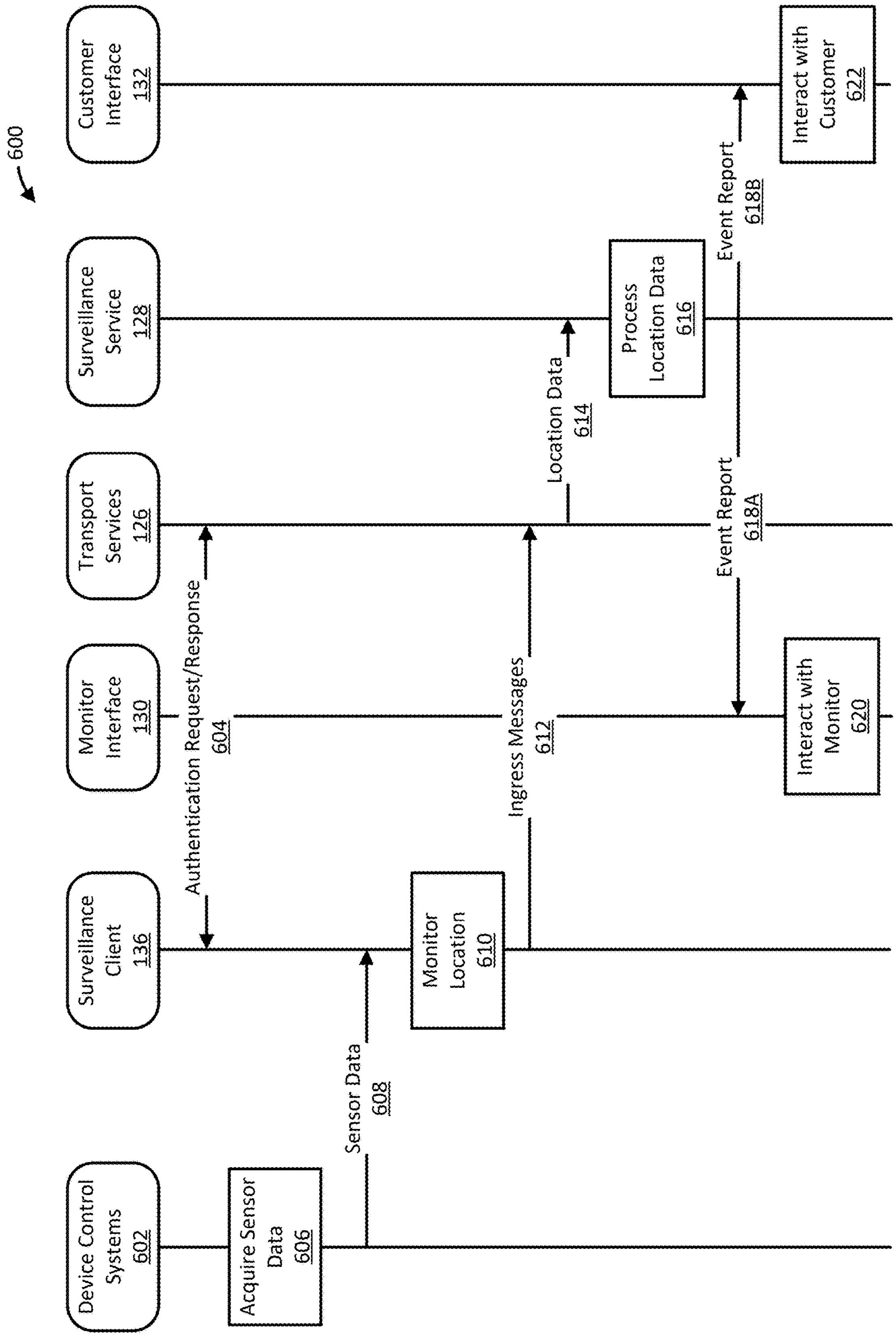
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., one or more of the code sets 208, 308, or 408 of FIGS. 2-4C) implemented by at least one processor (e.g., one or more of the processors 200, 300, and/or 400 of FIGS. 2-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4C. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
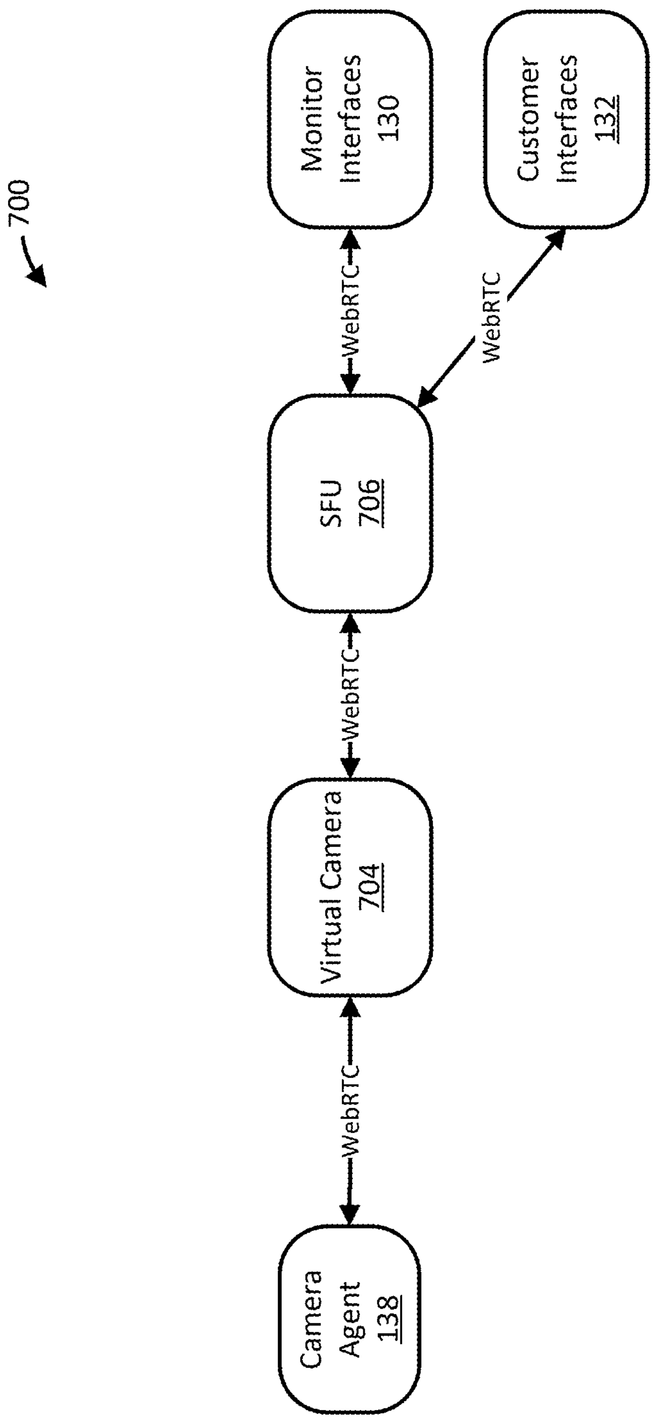
FIG. 7 is a schematic diagram of a computing platform, according to some examples disclosed herein.

Turning now to FIG. 7, a computing platform 700 is illustrated. The platform 700 includes several processes introduced in FIG. 1, namely the camera agent 138, one or more monitor interfaces 130, and one or more customer interfaces 132. These processes may be hosted by physical endpoint devices, such as the image capture device 110 of FIG. 1, the computing devices 518 of FIG. 5, and the customer devices 122 of FIG. 1. As shown in FIG. 7, the platform 700 further includes a virtual device 704 and a selective forwarding unit (SFU) 706. The virtual device 704 and the SFU 706 may be implemented as part of the surveillance service 128 hosted by the data center environment 124 of FIG. 1.

As shown in FIG. 7, the platform 700 is configured to implement an interactive communication session (e.g., a real time communication session) between the camera agent 138, the monitor interfaces 130, and the customer interfaces 132. For instance, in some examples, the camera agent 138 and the virtual device 704 are configured to interoperate (e.g., via one or more API calls) to establish a WebRTC connection. Within this WebRTC connection, the camera agent 138 and the virtual device 704 can communicate with one another in real-time through the exchange of real-time transport protocol (RTP) packets. As is further illustrated in FIG. 7, the virtual device 704, the monitor interfaces 130, and the customer interfaces 132 are configured to interoperate with the SFU 706 to establish individual WebRTC connections. Likewise, the SFU 706 is configured to interoperate with the virtual device 704, the monitor interfaces 130, and the customer interfaces 132 to establish the individual WebRTC connections. Once the WebRTC connections are established, users of the endpoint devices may communicate with one another through user interfaces of the endpoint devices.

Figure 15:
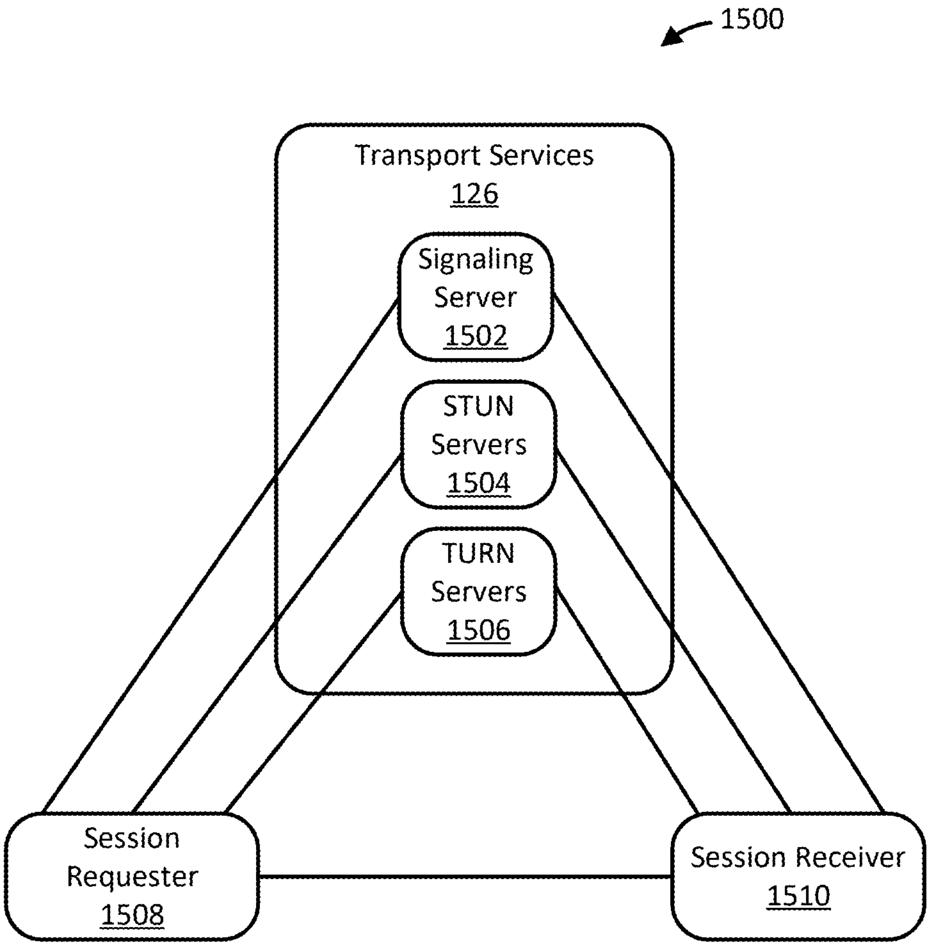
FIG. 15 is a schematic diagram of processes involved in establishing and conducting real-time communication sessions, according to some examples disclosed herein.

Turning to FIG. 15, a set of processes 1500 involved in establishing and conducting an interactive communication session (e.g., a real-time communication session) via a WebRTC connection is illustrated as a schematic diagram. As shown in FIG. 15, the set of processes 1500 includes the transport services 126, which are described above with reference to FIGS. 1 and 5. As is further shown in FIG. 15, the transport services 126 include a signaling server 1502, one or more Session Traversal Utilities for Network Address Translators (STUN) servers 1504, and one or more Traversal Using Relays around Network Address Translators (TURN) servers 1506. The set of processes 1500 further includes at least one session requester 1508 and at least one session receiver 1510. For example, the requester 1508 can be the virtual device 704 and the receiver 1510 can be the camera agent 138, or vice versa. In another example, the requester 1508 can be the virtual camera 704 and the receiver 1510 can be the SFU 706, or vice versa. In another example, the requester can be the one of the monitor interfaces 130 and/or customer interfaces 132, and the receiver can be the SFU 706, or vice versa. Other variations will be apparent, given the benefit of this disclosure.

In some examples, during an interactive communication session, the requester 1508 is configured to communicate with the receiver 1510 via the signaling server 1502 to establish a real-time communication session via, for example, a WebRTC framework. The signaling server 1502 is configured to act as an intermediary or broker between the requester 1508 and the receiver 1510 while a communication session is established. As such, in some examples, an address (e.g., an IP address and port) of the signaling server 1502 is accessible to both the requester 1508 and the receiver 1510. For instance, the IP address and port number of the signaling server 1502 may be stored as configuration data in memory local to the devices hosting the requester 1508 and the receiver 1510. In some examples, the receiver 1510 is configured to retrieve the address of the signaling server 1502 and to register with the signaling server 1502 during initialization to notify the signaling server of its availability for real-time communication sessions. In these examples, the requester 1508 is configured to retrieve the address of the signaling server 1502 and to connect with the signaling server 1502 to initiate communication with the receiver 1510 as part of establishing a communication session with the receiver 1510. In this way, the signaling server 1502 provides a central point of contact for a host of requesters including the requester 1508 and a central point of administration of a host of receivers including the receiver 1510.

Continuing with the example of FIG. 15, the STUN servers 1504 receive, process, and respond to requests from other devices seeking their own public IP addresses. In some examples, individual requesters 1508 and the receiver 1510 are configured to interoperate with the STUN servers 1504 to determine the public IP address of its host device. The TURN servers 1506 receive, process, and forward WebRTC messages from one device to another. In some examples, individual requesters 1508 and the receiver 1510 are configured to interoperate with the TURN servers 1506, if a WebRTC session that utilizes the public IP addresses of the host devices cannot be established (e.g., a network translation device, such as a firewall, is interposed between the host devices).

In some examples, a requester 1508 exchanges interactive connectivity establishment (ICE) messages with the STUN servers 1504 and/or the TURN servers 1506. Via this exchange of the messages, the requester 1508 generates one or more ICE candidates and includes the one or more ICE candidates within a message specifying an SDP offer. Next, the requester 1508 transmits the message to the signaling server 1502, and the signaling server 1502 transmits the message to the receiver 1510. The receiver 1510 exchanges ICE messages with the STUN servers 1504 and/or the TURN servers 1506, generates one or more ICE candidates and includes the one or more ICE candidates within a response specifying an SDP answer. Next, the receiver 1510 transmits the response to the signaling server 1502, and the signaling server 1502 transmits the response to the requester 1508. Via the messages, the requester 1508 and the receiver 1510 negotiate communication parameters for a real-time communication session and open the real-time communication session.

Referring again to FIG. 7, according to certain examples, individual endpoint devices are configured to receive input (e.g., audio input, video input, textual input, etc.) from their users and stream the received input over the WebRTC connections. For instance, in some examples, the camera agent 138 is configured to receive audiovisual input via a user interface (e.g., a camera and a microphone) incorporated within its host device. In these examples, e.g., the camera agent 138 is further configured to control a network interface within its host device to stream data representing the audiovisual input to the virtual camera 704. This media stream may be communicated via RTP packets sent over the WebRTC connection between the camera agent 138 and the virtual camera 704. Similarly, in certain examples, the monitor interfaces 130 and the customer interfaces 132 are configured to receive audiovisual input via user interfaces incorporated within their host devices and to stream data representing the audiovisual input to the SFU 706.

Continuing with the example of FIG. 7, the SFU 706 is configured to receive media streams from the monitor interfaces 130, the customer interfaces 132, and the virtual camera 704; process the received media streams; and transmit processed media streams based on the received media streams to the monitor interfaces 130, the customer interfaces 132, and the virtual camera 704. In some examples, the SFU 706 is configured to transmit, for individual media streams received, a corresponding processed media stream to processes that did not originate the received media stream. For instance, in these examples, the SFU 706 is configured to transmit a processed media stream that corresponds to a media stream received from the virtual camera 704 to the monitor interfaces 130 and the customer interfaces 132, but the SFU 706 is configured to refrain from transmitting a processed media stream that corresponds to the media stream received from the virtual camera 704 back to the virtual camera 704. Further, in these examples, the SFU 706 is similarly configured to refrain from transmitting a processed media stream that corresponds to a received media stream back to the interface (e.g., either of the interfaces 130 or 132) that originated the received media stream.

The media stream processing that the SFU 706 is configured to execute varies between examples. For instance, in some examples, the SFU 706 is configured to simply replicate and relay (e.g., readdress) received media streams (e.g., video and audio recordings) to generate corresponding processed media streams prior to transmission of the same. Alternatively or additionally, the SFU 706 may be configured to analyze the received media streams and to transcode, or otherwise transform, the received media streams to generate the processed media streams. For instance, in these examples, the SFU 706 may sample a received media stream to generate a processed media stream that complies with attributes of the WebRTC connection (e.g., available bandwidth) through which the processed media stream is transmitted. Alternatively or additionally, in these examples, the SFU 706 may transform a received media stream to a processed media stream that can be properly handled (e.g., displayed at a supported resolution, decoded by an available codec, etc.) by a receiving process and/or the host device of the receiving process. Other types of processing that the SFU 706 may be configured to execute will be apparent in light of this disclosure.

In some examples, the virtual device 704 is configured to operate as a cloud-based proxy for the camera agent 138. As such, the virtual device 704 has access to computing, storage, and network resources with capacities that far exceed those available to the camera agent 138. Access to these resources, in turn, allows the architectural combination of the virtual device 704 and the camera agent 138 to execute computationally complex and/or time sensitive processes that the camera agent 138 would be unable to execute at a required level of service (e.g., in real-time) alone. Further, the results of these computationally complex processes can be made available to the camera agent 138 (e.g., via the WebRTC connection between the virtual camera 704 and the camera agent 138) to enhance the experience of users of the image capture device hosting the camera agent 138. It should be noted that the cloud resources allocated to the virtual device 704 can be tailored and dedicated to support the camera agent 138, rather than a general purpose computing device. As such, the type and amount of the cloud resources can be different (e.g., less than) those required to support, for example, a virtual desktop.

In some examples, a virtual camera is a software service that is configured to simulate a physical camera. In some examples, the virtual camera may instantiate one or more software objects, having various properties and methods, to execute operations associated with physical cameras. As such, the virtual camera may implement methods that execute image and audio processing, object detection, motion tracking, and other processes that consume substantial computational resources. Virtual cameras, which may be implemented via cloud infrastructure, can scale up computational resources to handle processing loads on the fly, whereas physical cameras may be limited to the computational and other resources (e.g., memory) provided by internal hardware.

Figure 8:
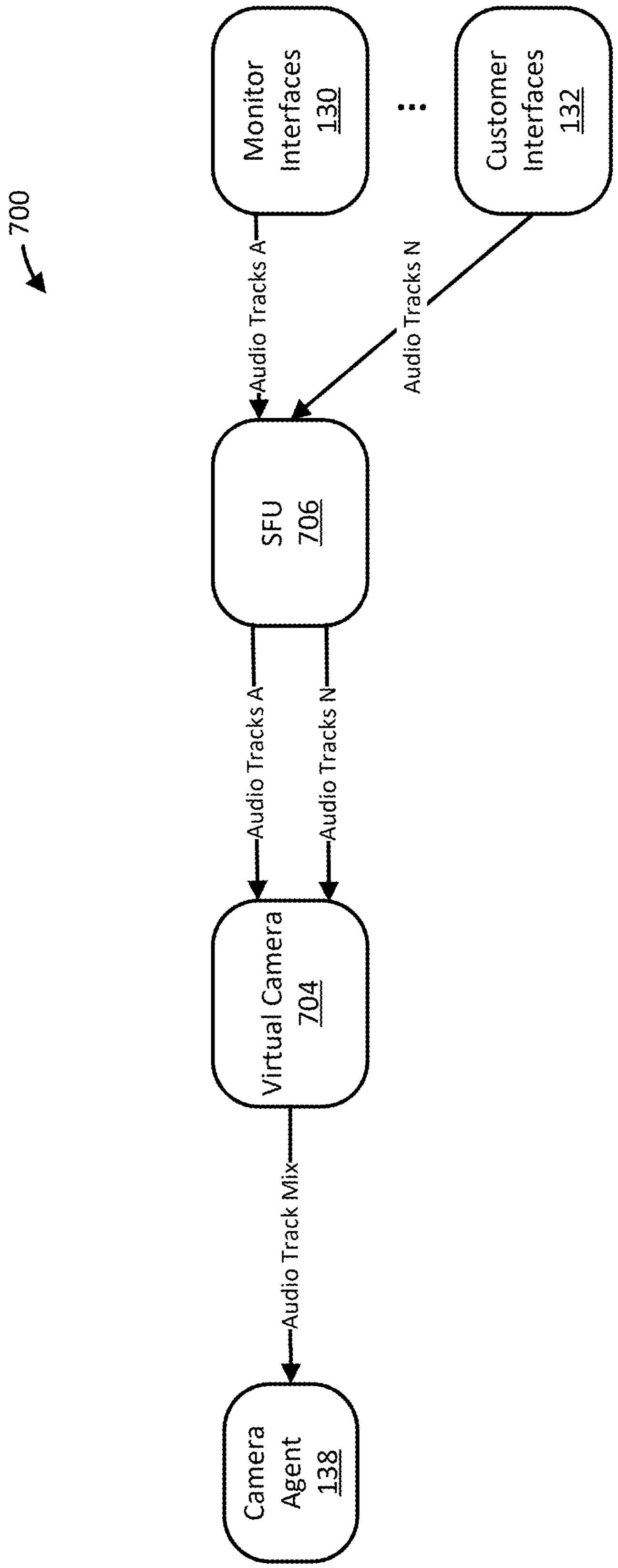
FIG. 8 is a schematic diagram of a computing platform, according to some examples disclosed herein.

FIG. 8 illustrates one example of a computationally complex and time sensitive process enabled by the combination of the virtual camera 704 and the camera agent 138. M ore specifically, FIG. 8 illustrates a progression of audio tracks through the virtual conference platform 700. In this example, the virtual camera 704 is configured to stream data representing a mixture of audio input received from the monitor interfaces 130 and the customer interfaces 132 to the camera agent 138. The camera agent 138, in turn, is configured to render the streamed audio data via one or more speakers included within its host image capture device.

As shown in FIG. 8, within the context of a virtual conference, the monitor interfaces 130 stream audio tracks A to the SFU 706 via first respective connections (e.g. WebRTC connections) and the customer interfaces 132A stream audio tracks N to the SFU 706 via second respective connections. The SFU 706, in turn, streams both audio tracks A and N to the virtual camera 704 via a third connection. The virtual camera 704 receives both audio tracks A and N, generates an audio track mix that combines the audio tracks A and N, and transmits the audio track mix to the camera agent 138 via a fourth connection. The camera agent 138 renders the audio track mix via a speaker incorporated into its host image capture device. In at least some examples in which the first through the fourth connections include WebRTC connections, the audio track mix and the audio tracks A and N may be communicated between the processes illustrated in FIG. 8 via RTP packets.

It should be noted that generating the audio track mix in real time can be difficult for certain image capture devices with constrained computing resources. These difficulties can degrade the quality of an interactive communication session by, for example, introducing jitter, delayed audio, and/or omitted audio. Moreover, even where an image capture device has sufficient computing resources to generate the audio track mix on the fly and in real time, as would be required in an interactive communication session, doing so may consume substantial power. This can be undesirable for image capture devices in general and particularly undesirable for image capture devices that are battery powered. As such, introduction of the virtual device 704 to a topology of a computing platform, such as the platform 700, can provide a high quality user experience without some of the drawbacks of other architectures.

It should also be noted that, in the example described above, audio tracks A-N may be replaced by audiovisual tracks A-N. In this situation, the virtual device 704 may extract audio tracks A-N from the audiovisual tracks A-N and generate the audio track mix from the extracted audio tracks. In this way, the virtual device 704 prepares and streams data tailored to the capabilities of the camera agent 138 and its host image capture device.

Figure 9A:
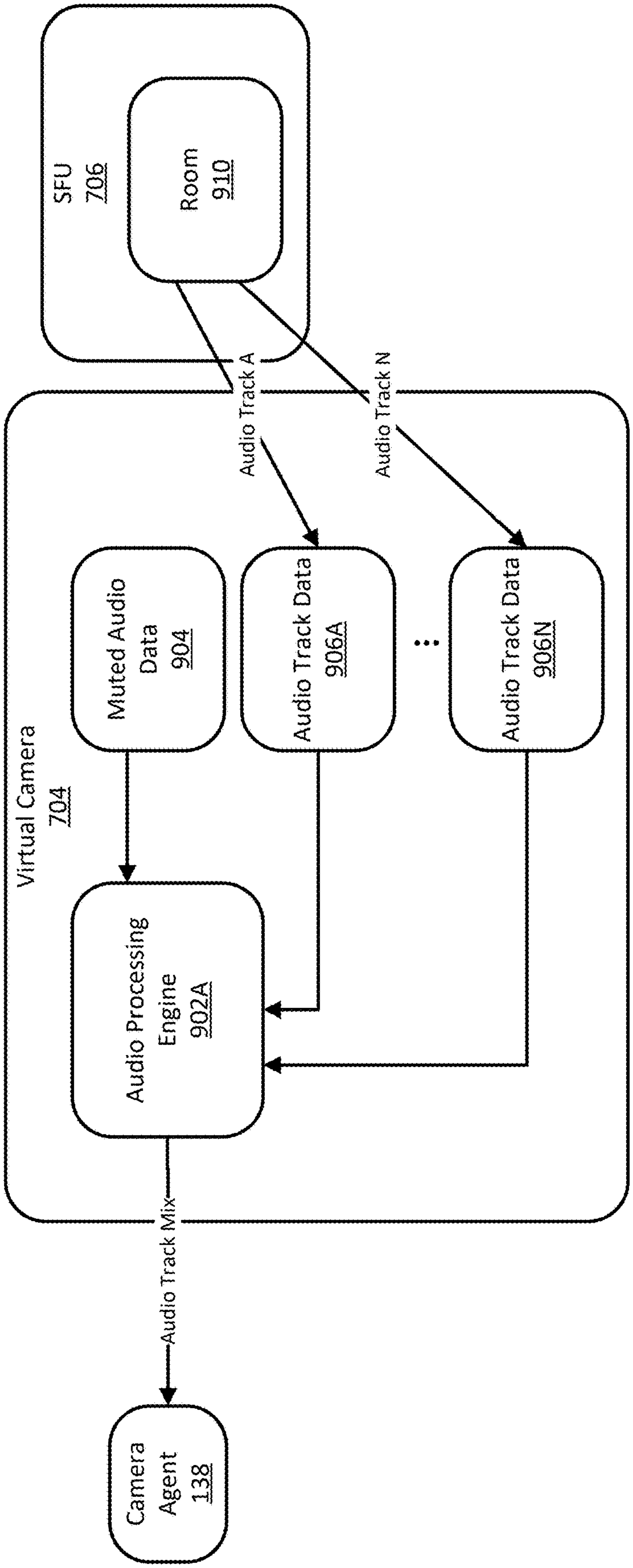
FIG. 9A is a schematic diagram of a computing platform including details regarding a virtual camera, according to some examples disclosed herein.

Turning now to FIG. 9A, selected parts of one implementation of the platform 700 are illustrated in further detail. As shown in FIG. 9A, the SFU 706 includes a virtual room 910 and the virtual device 704 includes muted audio data 904, portions of audio track data 906A-906N, and an audio processing engine 902A. The audio data 904 and 906A-906N may be stored, for example, in memory allocated for use by the virtual camera 704 and the engine 902A may be code stored in the memory and executed within a data center environment (e.g., the data center environment 124 of FIG. 1) under control of the virtual camera 704.

In certain examples, the virtual room 910 is a data object implemented within the SFU 706 that organizes connections (e.g., WebRTC connections) into groups that share media streams with one another. One example of code that can be used to create a virtual room within the SFU 706 can be found within the livekit package available at github.com. As shown in FIG. 9A, participants in the virtual room 910 include the monitor interfaces 130 and the customer interfaces 132 of FIG. 8 and the virtual device 704. As such, the SFU 706 is configured to stream audio tracks A-N to the virtual camera 704 via a connection while an interactive communication session between the monitor interfaces 130, the customer interfaces 132, and the camera agent 138 is ongoing.

In some examples, the virtual device 704 is configured to generate the muted audio data 904. For instance, in some examples, the virtual camera 704 is configured to initiate generation of the muted audio data 904 during initiation of the interactive communication session (e.g., during or after establishment of the connection between the camera agent 138 and the virtual camera 704). Further, in these examples, the virtual camera 704 is configured to initiate execution of the engine 902A and to pass the muted audio data 904 to the engine 902A to initiate generation and transmission of a media stream to the camera agent 138. In some examples, by passing the muted audio data 904 to the engine 902A during initialization, the virtual device 704 primes a processing pipeline implemented by the engine 902A to generate the media stream. In this way, the virtual device 704 avoids potential synchronization issues (such as latency) when introducing new audio tracks to the media stream. Such synchronization issues may otherwise degrade the experience of the user of the camera agent 138. Moreover, in some examples, the design of the virtual camera 704 can be simplified by starting an audio processing pipeline concurrently with connection to the camera agent 138 because, in this situation, the virtual camera 704 need not manage the state of the audio processing pipeline. However, a virtual camera with this simplified design may utilize more computing resources than a virtual camera that manages pipeline state by turning on and off the audio processing pipeline as needed.

Figure 10A:
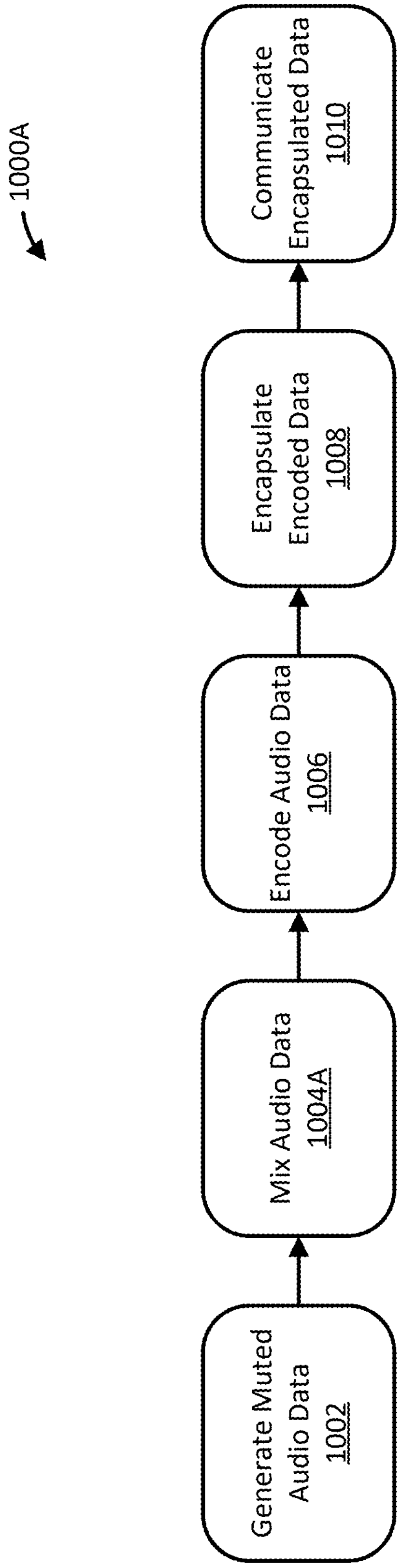
FIG. 10A is a flow diagram illustrating a data processing pipeline, according to some examples disclosed herein.

FIG. 10A illustrates one example of a processing pipeline 1000A implemented by the engine 902A to generate and transmit a media stream using a single, muted audio source (e.g., the muted audio data 904 of FIG. 9A). In some examples, the pipeline 1000A is implemented prior to participants joining an interactive communication session (e.g., the virtual room 910 of FIG. 9A). In this example, rather than storing muted audio data 904 within memory and passing the same to the engine 902A, the virtual device 704 instead issues a request to the engine 902A to generate the muted audio data 904 on the fly. Thus, as shown in FIG. 10A, the pipeline 1000A starts with the engine 902A receiving a request message (e.g., an API call) to generate the muted audio data 904 and in response thereto generates 1002 muted audio data. One example of code that can be used to perform this operation can be found within the audiotestsrc plugin to the G Streamer package available at gitlab.freedesktop.org.

Continuing with the example of FIG. 10A, the engine 902A mixes 1004A the muted audio data with audio data from other tracks (e.g., the audio data 906A-906N of FIG. 9A), if such data is present, to produce an audio track mix. For instance, in some examples, the engine 902A balances the audio data from the other tracks and combines the balanced audio data with the muted audio data. As stated above, in the present example, the pipeline 1000A is processing audio data from a single, muted source. As such, the mixing operation 1004A illustrated in FIG. 10A initializes mixer processing but does not actually mix the muted audio data 904 with other audio data. One example of code that can be used to perform this operation can be found within the audiomixer plugin to the G Streamer package available at gitlab.freedesktop.org.

Continuing with the example of FIG. 10A, the engine 902A encodes 1006 the audio track mix, thereby compressing the mix to decrease the resources required for its storage and transmission. For instance, in some examples, the engine 902A encodes the audio track mix to comply with the opus format, although other coding formats may be used. One example of code that can be used to perform this operation can be found within the opusenc function of the opus plugin to the G Streamer package available at gitlab.freedesktop.org.

Continuing with the example of FIG. 10A, the engine 902A encapsulates 1008 the encoded audio track mix for transport via a media stream. For instance, in some examples, the engine 902A partitions the audio track mix into distinct payloads and stores the payloads within RTP packets. One example of code that can be used to perform this operation can be found within the rtpopuspay function of the rtp plugin to the G Streamer package available at gitlab.freedesktop.org.

Continuing with the example of FIG. 10A, the engine 902A communicates 1010 the encapsulated audio track mix to a process requesting the same. For instance, in some examples, the engine 902A streams RTP packets encapsulating the audio track mix in response to an API call from a camera agent (e.g., the camera agent 138 of FIG. 9A) requesting the same. One example of code that can be used to perform this operation can be found within the GstAppSink library of the G Streamer package available at gitlab.freedesktop.org.

Returning to examples illustrated by FIG. 9A, during an interactive communication session involving N participants, the virtual camera 704 is configured to receive the audio track data 906A-906N from the SFU 706. In these and other examples, the virtual camera 704 is configured to pass the audio track data 906A-906N to the engine 902A for processing. The engine 902A, in turn, is configured to continue to generate and transmit the audio track mix, which will incorporate audio tracks A through N, to the camera agent 138.

Figure 11A:
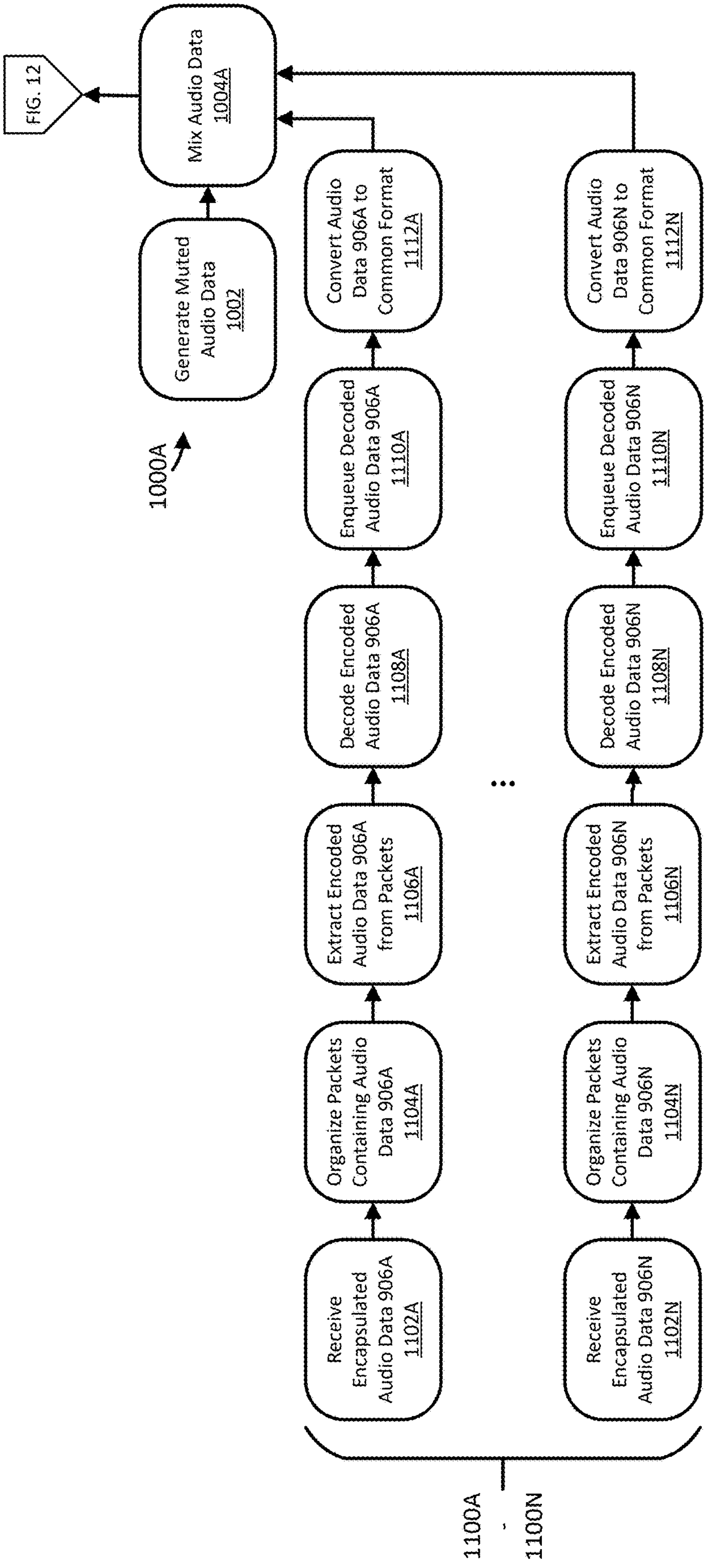
FIGS. 11A and 12 are a flow diagram illustrating data processing pipelines, according to some examples disclosed herein.
Figure 12:
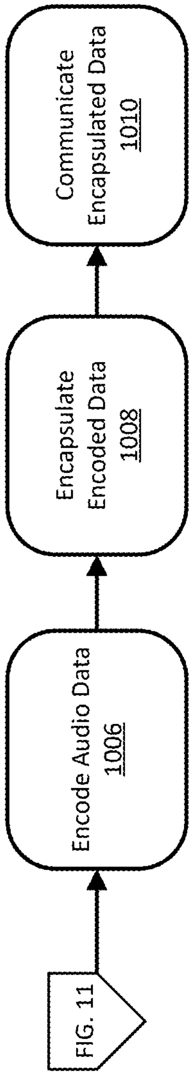

FIGS. 11A and 12 illustrate one example of a plurality of processing pipelines 1100A-1100N and the pipeline 1000A implemented by the engine 902A to generate and transmit a media stream using multiple audio sources (e.g., the audio data 904 and 906A-906N of FIG. 9A). As illustrated in FIGS. 11A and 12, the pipelines 1100A-1100N interoperate with the processing pipeline 1000A described above with reference to FIG. 10A. Repetitive descriptions of the processes of the pipeline 1000A involved with the pipelines 1100A-1100N are omitted for brevity, but the previous descriptions of the processes of the pipeline 1000A apply to their involvement with the pipelines 1100A-1100N.

As shown in FIG. 11A, the pipelines 1100A-1100N start with the engine 902A receiving request messages (e.g., API calls) to insert encapsulated audio track data 906A-906N into the pipelines 1100A-1100N. For instance, in some examples, the virtual camera 704 communicates the request messages in response to reception of the audio track data 906A-906N. As part of the operations 1102A-1102N, the engine 902A may store the audio track data 906A-906N in memory allocated for use by the engine 902A. One example of code that can be used to perform these operations can be found within the GstAppSrc library of the GStreamer package available at gitlab.freedesktop.org.

Continuing with examples illustrated by FIG. 11A, the engine 902A organizes 1104A-1104N the encapsulated audio track data 906A-906N received in the operations 1102A-1102N. For instance, in examples wherein the audio track data 906A-906N is encapsulated within RTP packets, the engine 902A sequences the packets, checks to ensure the packets originate from a common source, and executes other housekeeping measure to ensure RTP packets encapsulating the tracks of audio data have been properly received. One example of code that can be used to perform this operation can be found within the rtpbin function of the rtpmanger plugin to the G Streamer package available at gitlab.freedesktop.org.

Continuing with examples illustrated by FIG. 11A, the engine 902A parses the encapsulated audio track data 906A-906N to extract 1106A-1106N encoded audio track data 906A-906N. For instance, in examples wherein the audio track data 906A-906N is encapsulated within RTP packets, the engine 902A parses the packets and extracts encoded audio data 906A-906N therefrom. One example of code that can be used to perform this operation can be found within the rtpopuspay function of the rtp plugin to the GStreamer package available at gitlab.freedesktop.org.

Continuing with examples illustrated by FIG. 11A, the engine 902A decodes 1108A-1108N the encoded audio track data 906A-906N extracted in the operations 1106A-1106N. For instance, in some examples where the coding format of the encoded audio track data 906A-906N is opus, the engine 902A decodes the encoded audio track data 906A-906N from opus to another format, such as pulse-code modulation (PCM) format. One example of code that can be used to perform this operation can be found within the opusdec function of the opus plugin to the G Streamer package available at gitlab.freedesktop.org.

Continuing with examples illustrated by FIG. 11A, the engine 902A enqueues 1110A-1110N the decoded audio track data 906A-906N. For instance, in some examples, the engine 902A stores the decoded audio track data 906A-906N within a queue data structure in memory for subsequent processing. One example of code that can be used to perform this operation can be found within the queue plugin to the G Streamer package available at gitlab.freedesktop.org.

Continuing with examples illustrated by FIG. 11A, the engine 902A dequeues and converts 1112A-1112N the audio track data 906A-906N enqueued by the operations 1110A-1110N. For instance, in some examples, the engine 902A dequeues and converts the audio track data 906A-906N from PCM to a common format (e.g., WAV or some other format) used during mixing of the audio track data 906A-906N in the mixing operation 1004A described above. One example of code that can be used to perform this operation can be found within the audioconvert plugin to the G Streamer package available at gitlab.freedesktop.org.

Returning to examples illustrated by FIG. 9A, the camera agent 138 is configured to receive the audio track mix and renders the audio track mix through one or more speakers included within its host image capture device.

Figure 9B:
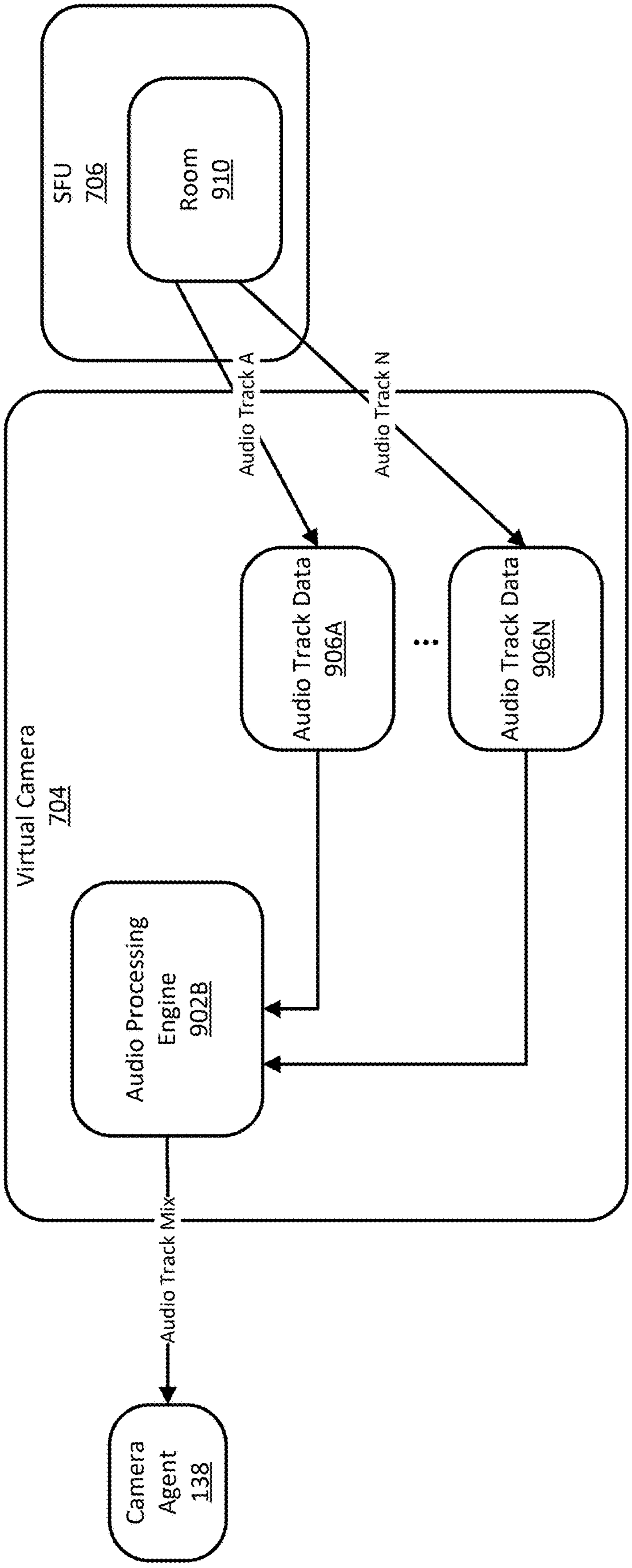
FIG. 9B is a schematic diagram of a computing platform including details regarding another virtual camera, according to some examples disclosed herein.

Turning now to FIG. 9B, selected parts of another implementation of the platform 700 are illustrated in further detail. The implementation illustrated in FIG. 9B includes the features of the implementation illustrated in FIG. 9A but omits the muted audio data 904 and replaces the engine 902A with an audio processing engine 902B. The engine 902B may be code stored in a computer memory and executed within a data center environment (e.g., the data center environment 124 of FIG. 1) under control of the virtual camera 704.

In some examples, the virtual camera 704 is configured to initiate execution of the engine 902B and to pass the audio data 906A-906N to the engine 902B to initiate generation and transmission of a media stream to the camera agent 138. In some examples, by passing the audio data 906A-906N to the engine 902B during initialization, the virtual device 704 primes a processing pipeline implemented by the engine 902B to generate the media stream.

Figure 10B:
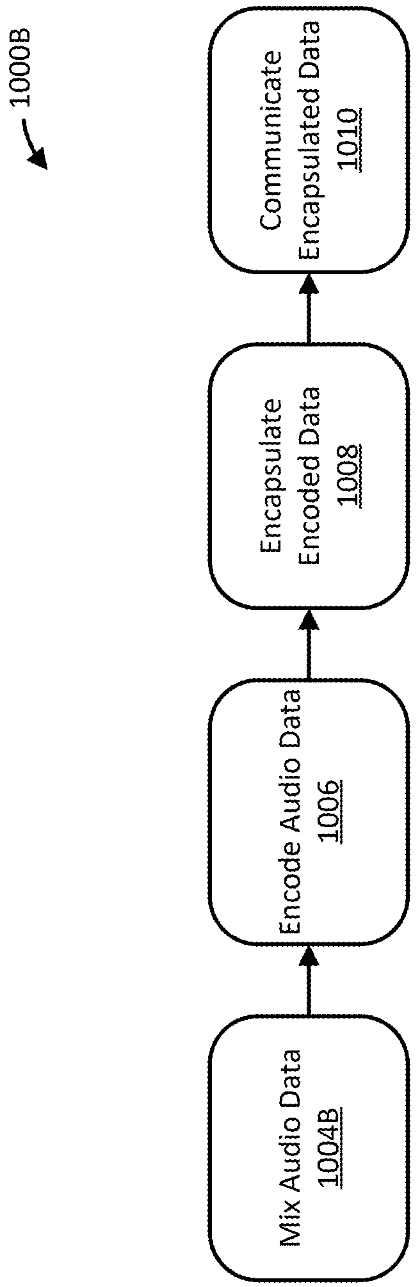
FIG. 10B is a flow diagram illustrating another data processing pipeline, according to some examples disclosed herein.

FIG. 10B illustrates one example of a processing pipeline 1000B implemented by the engine 902B to generate and transmit a media stream using one or more audio sources (e.g., the audio data 906A-906N of FIG. 9B). In some examples, the pipeline 1000B is implemented when one or more participants join an interactive communication session (e.g., the virtual room 910 of FIG. 9B). The pipeline 1000B illustrated in FIG. 10B includes the features of the pipeline 1000A illustrated in FIG. 10A but omits the operation 1002 and replaces the mixing operation 1004A with a mixing operation 1004B. Within the mixing operation 1004B, the engine 902B mixes 1004B audio data from one or more tracks (e.g., the audio data 906A-906N of FIG. 9B) to produce an audio track mix. For instance, in some examples, the engine 902B balances the audio data of the other tracks and combines the balanced audio data into a single audio track. One example of code that can be used to perform this operation can be found within the audiomixer plugin to the G Streamer package available at gitlab.freedesktop.org.

Figure 11B:
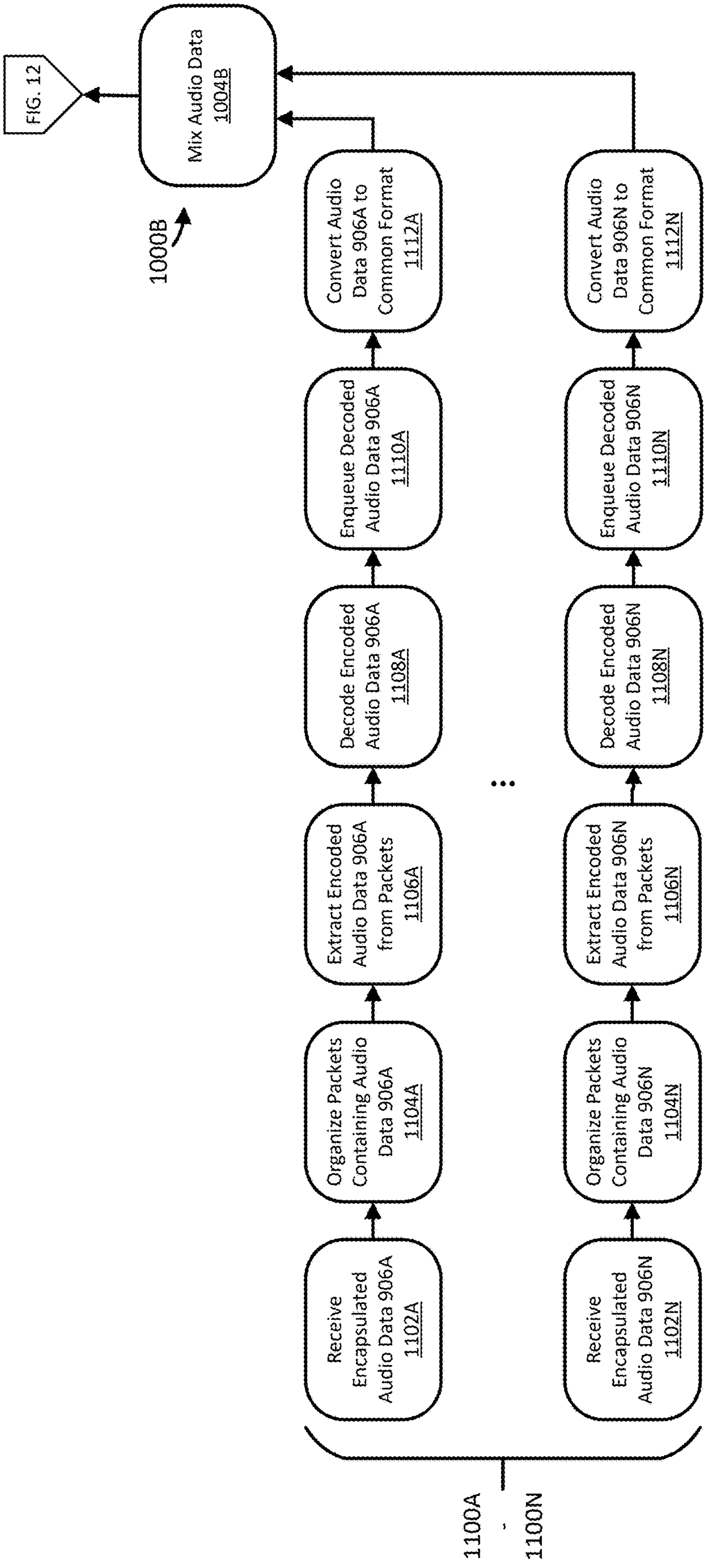

The pipeline 1000B may interoperate with the plurality of processing pipelines 1100A-1100N described above with reference to FIG. 11A. FIGS. 11B and 12 illustrate one example of such interoperation as implemented by the engine 902B. Via this interoperation, the engine 902B generates and transmits a media stream using multiple audio sources (e.g., the audio data 906A-906N of FIG. 9B). As illustrated in FIGS. 11B and 12, the pipelines 1100A-1100N interoperate with the processing pipeline 1000B described above with reference to FIG. 10B. Repetitive descriptions of the processes of the pipeline 1000B involved with the pipelines 1100A-1100N are omitted for brevity, but the previous descriptions of the processes of the pipeline 1000B apply to their involvement with the pipelines 1100A-1100N.

Figure 13:
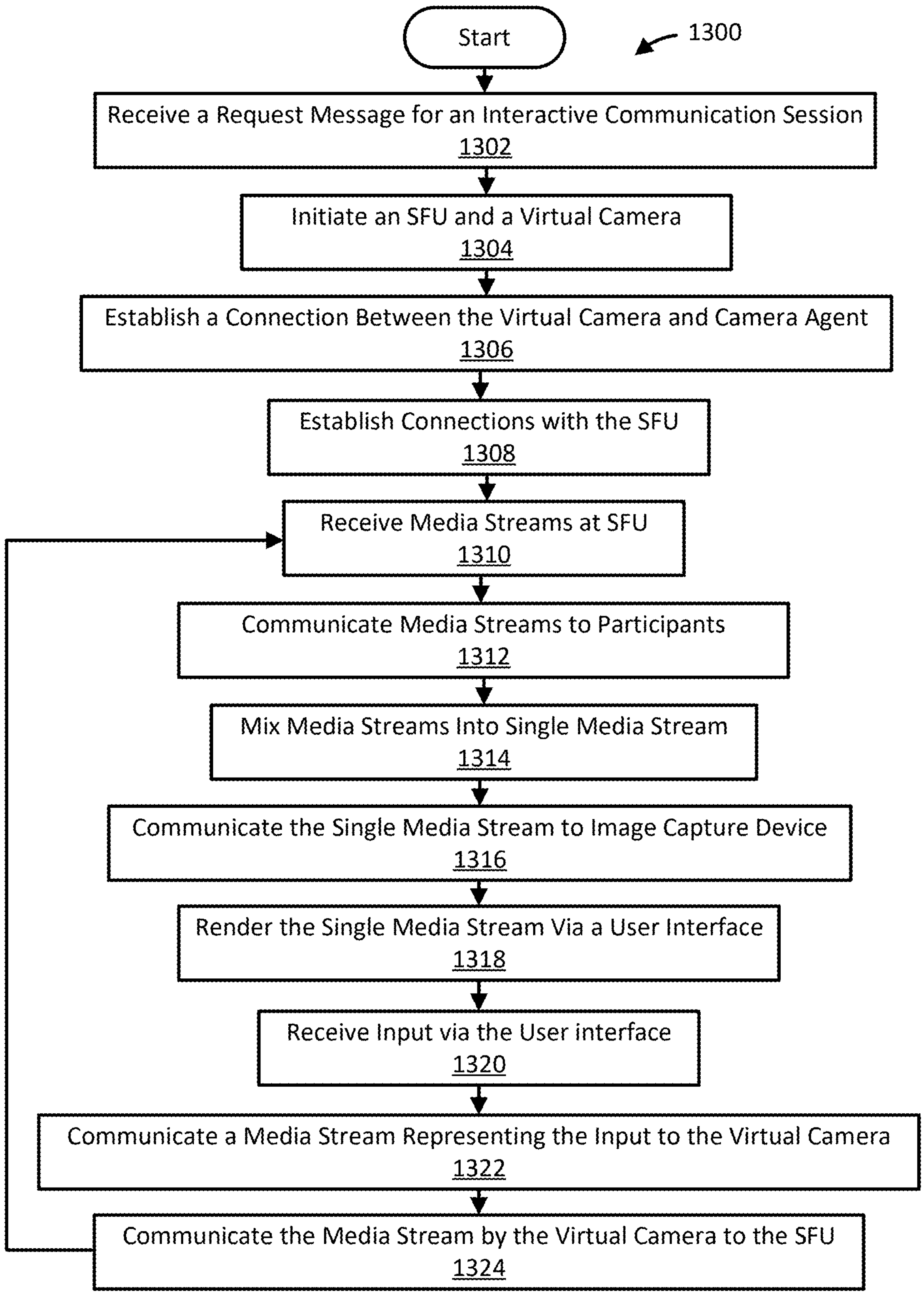
FIG. 13 is a flow diagram of a process of hosting a computing, according to some examples disclosed herein.

Turning now to FIG. 13, an audio mixing process 1300 is illustrated. The process can be executed, in some examples, by a security system (e.g. the security system 100 of FIG. 1). More specifically, in some examples at least a portion of the process 1300 is executed by the location-based devices under the control of device control system (DCS) code (e.g., the code 208, 308, or 408 of FIGS. 2-4C) implemented by at least one processor (e.g., the processors 200, 300, or 400 of FIGS. 2-4C). The DCS code can include, for example, a camera agent (e.g., the camera agent 138 of FIG. 1). At least a portion of the process 1300 may be executed by a base station (e.g., the base station 114 of FIG. 1) under control of a surveillance client (e.g., the surveillance client 136 of FIG. 1). At least a portion of the process 1300 may be executed by a monitoring center environment (e.g., the monitoring center environment 120 of FIG. 1) under control of a monitor interface (e.g., the monitor interface 130 of FIG. 1). At least a portion of the process 1300 may be executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 1300 may be executed by a customer device (e.g., the customer device 122 of FIG. 1) under control of a customer interface (e.g., customer interface 132 of FIG. 1).

As shown in FIG. 13, the process 1300 starts with the surveillance service receiving 1302 a message requesting initiation of an interactive (e.g., real-time) communication session with an image capture device installed at a monitored location. For instance, in some examples, one of the monitor interfaces transmits the request message in response to a monitoring professional entering input requesting the same as part of handling an alarm at the monitored location. The request message may be, for example, an API call transmitted by the monitor interface and specifying an identifier of the image capture device.

Continuing with the process 1300, the surveillance service may initiate 1304 operation of an SFU and a virtual camera (e.g., the SFU 706 and the virtual camera 704 of FIG. 7). For instance, in some examples, the surveillance service instantiates software objects persistently stored in memory within the data center environment that implement the SFU and the virtual camera. Moreover, in certain examples, as part of the operation 1304 the SFU instantiates a virtual room to support the requested interactive communication session.

Continuing with the process 1300, the virtual device establishes 1306 a connection with the image capture device identified in the request message received in the operation 1302. For instance, in some examples, the virtual camera interoperates with a camera agent hosted by the image capture device to establish a WebRTC connection. Upon establishment of the connection, in some examples, the virtual camera further instantiates an audio processing pipeline (e.g., the pipeline 1000A of FIG. 10A) and begins streaming muted audio data to the camera agent in preparation for streaming audio tracks received from participants in the interactive communication session. Priming the processing pipeline with muted audio data can smooth the introduction of audio tracks subsequently received from existing or new participants, in some examples. In other examples (e.g., those configured to implement the pipeline 1000B of FIG. 10B), the virtual camera does not instantiate an audio processing pipeline until operation 1314, described further below.

Continuing with the process 1300, the virtual device and the requester of the interactive communication session establish 1308 connections with the SFU and join the virtual room. For instance, in some examples, the virtual camera and the requester of the session interoperate with the SFU to establish a WebRTC connection. Other processes (e.g., a customer interface, other monitor interfaces, etc.) may establish connections with the SFU and join the virtual room to participate in the interactive communication session while the session remains active.

Continuing with the process 1300, the SFU receives 1310 media streams from the processes participating in the interactive communication session. For instance, in some examples, the SFU receives RTP packets from the virtual camera and the requester of the interactive communication session. In these examples, the RTP packets convey audio-visual and/or audio track data that originates from endpoint devices such as the image capture device or a computing device operated by monitoring personnel or a customer.

Continuing with the process 1300, the SFU communicates 1312 the media streams received in the operation 1310 to the participating processes. For instance, in some examples, the SFU communicates a media stream originated by the image capture device, and received via the virtual camera, to a monitor interface and a customer interface joined to the virtual room and participating in the interactive communication session. Further, in these examples, the SFU communicates, to the virtual camera, a first media stream originated from a computing device hosting the monitor interface and a second media stream originated from a computing device hosting the customer interface.

Continuing with the process 1300, the virtual device mixes 1314 the first media stream with the second media stream. For instance, in some examples, the virtual device implements a plurality of pipelines (e.g., the pipelines 1100A-1100N of FIG. 11A or FIG. 11B) to mix the first and second media streams. In some examples (e.g., those implementing the process interoperations illustrated in FIG. 11A), within the operation 1314 the virtual device mixes the first and second media streams with a previously initiated muted audio stream, as discussed above. In other examples, (e.g., those implementing the process interoperations illustrated in FIG. 11B), within the operation 1314 the virtual device initiates an audio processing pipeline (e.g., the pipeline 1000B of FIG. 10B) and mixes the first and second media streams without involving a muted audio stream, as discussed above.

Continuing with the process 1300, the virtual device communicates 1316 a single, combined audio track mix to the camera agent. For instance, in some examples, the virtual device streams the audio track mix to the camera agent via RTP packets within a WebRTC connection.

Continuing with the process 1300, the camera agent renders 1318 the audio track mix via a user interface of its host image capture device. For instance, in some examples, the camera agent renders the audio track mix via a speaker housed within the image capture device.

Continuing with the process 1300, the camera agent receives 1320 audiovisual input from an interaction between the image capture device and a user. For instance, in some examples, the camera agent receives the audiovisual input from a camera and microphone housed within the image capture device.

Continuing with the process 1300, the camera agent communicates 1322 media data specifying the audiovisual input to the virtual camera. For instance, in some examples, the camera agent streams the media data to the virtual camera within a sequence of RTP packets transmitted via a WebRTC connection.

Continuing with the process 1300, the virtual device communicates 1324 the media data to the SFU for distribution to the processes joined to the virtual room and participating in the interactive communication session. For instance, in some examples, the virtual camera streams the media data to the SFU within a sequence of RTP packets transmitted via a WebRTC connection.

The process 1300 may continue indefinitely until, for example, the original requester of the interactive communication session leaves the virtual room. Other ways in which the interactive communication session may end will be apparent in view of this disclosure.

Figure 14:
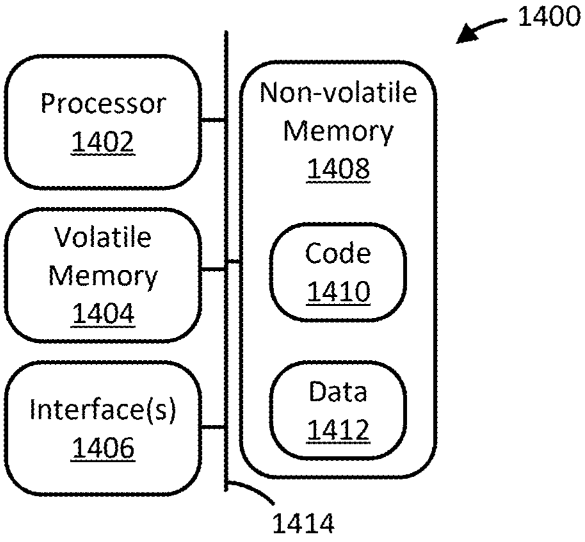
FIG. 14 is a schematic diagram of a computing device, according to some examples described herein.

Turning now to FIG. 14, a computing device 1400 is illustrated schematically. As shown in FIG. 14, the computing device includes at least one processor 1402, volatile memory 1404, one or more interfaces 1406, non-volatile memory 1408, and an interconnection mechanism 1414. The non-volatile memory 1408 includes code 1410 and at least one data store 1412.

In some examples, the non-volatile (non-transitory) memory 1408 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1410 stored in the non-volatile memory can include an operating system and one or more applications or programs that are configured to execute under the operating system. Alternatively or additionally, the code 1410 can include specialized firmware and embedded software that is executable without dependence upon a commercially available operating system. Regardless, execution of the code 1410 can result in manipulated data that may be stored in the data store 1412 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 14, the processor 1402 can be one or more programmable processors to execute one or more executable instructions, such as a computer program specified by the code 1410, to control the operations of the computing device 1400. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1404) and executed by the circuitry. In some examples, the processor 1402 is a digital processor, but the processor 1402 can be analog, digital, or mixed. As such, the processor 1402 can execute the function, operation, or sequence of operations using digital values and/or using analog signals. In some examples, the processor 1402 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLA s), or multicore processors. Examples of the processor 1402 that are multicore can provide functionality for parallel, simultaneous execution of instructions or for parallel, simultaneous execution of one instruction on more than one piece of data.

Continuing with the example of FIG. 14, prior to execution of the code 1410 the processor 1402 can copy the code 1410 from the non-volatile memory 1408 to the volatile memory 1404. In some examples, the volatile memory 1404 includes one or more static or dynamic random access memory (RAM) chips and/or cache memory (e.g. memory disposed on a silicon die of the processor 1402). Volatile memory 1404 can offer a faster response time than a main memory, such as the non-volatile memory 1408.

Through execution of the code 1410, the processor 1402 can control operation of the interfaces 1406. The interfaces 1406 can include network interfaces. These network interfaces can include one or more physical interfaces (e.g., a radio, an ethernet port, a USB port, etc.) and a software stack including drivers and/or other code 1410 that is configured to communicate with the one or more physical interfaces to support one or more LAN, PAN, and/or WAN standard communication protocols. The communication protocols can include, for example, TCP and UDP among others. As such, the network interfaces enable the computing device 1400 to access and communicate with other computing devices via a computer network.

The interfaces 1406 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1410 that is configured to communicate with the user input and/or output devices. As such, the user interfaces enable the computing device 1400 to interact with users to receive input and/or render output. This rendered output can include, for instance, one or more GU Is including one or more controls configured to display output and/or receive input. The input can specify values to be stored in the data store 1412. The output can indicate values stored in the data store 1412.

Continuing with the example of FIG. 14, the various features of the computing device 1400 described above can communicate with one another via the interconnection mechanism 1414. In some examples, the interconnection mechanism 1414 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method including initiating, by at least one processor within a computing environment, operation of a virtual device and a selective forwarding unit (SFU); receiving, by the SFU, a plurality of audio streams from a plurality of remote devices; communicating, by the SFU, the plurality of audio streams to the virtual device; receiving, by the virtual device, the plurality of audio streams from the SFU; mixing, by the virtual device, the plurality of audio streams into a single audio stream; and communicating, by the virtual device, the single audio stream to a physical image capture device.

Example 2 is a method including initiating, by at least one processor, operation of a virtual camera within a computing environment; receiving, by the virtual camera, a plurality of audio streams originating from a plurality of remote devices; mixing, by the virtual camera, the plurality of audio streams into a single audio stream; and communicating, by the virtual camera, the single audio stream to a physical image capture device at a remote location.

Example 3 includes the method of example 2 and further includes initiating operation of a selective forwarding unit (SFU) within the computing environment; receiving, by the SFU, the plurality of audio streams originating from the plurality of remote devices; and communicating, by the SFU, the plurality of audio streams to the virtual camera, wherein receiving, by the virtual camera, the plurality of audio streams includes receiving, by the virtual camera, the plurality of audio streams from the SFU.

Example 4 includes the method of either example 1 or example 3 and further includes receiving, by the virtual device, an audiovisual stream from the physical image capture device.

Example 5 includes the method of any one of examples 1, 3, or 4 and further includes communicating, by the virtual device, the audiovisual stream to the SFU; receiving, by the SFU, the audiovisual stream from the virtual device; and communicating, by the SFU, the audiovisual stream to the plurality of remote devices.

Example 6 includes the method of either example 4 or example 5, wherein receiving the plurality of audio streams comprises receiving a first plurality of real-time protocol (RTP) packets;

communicating the single audio stream comprises communicating a second plurality of RTP packets; and receiving the audiovisual stream comprises receiving a third plurality of RTP packets.

Example 7 includes the method of example of any of examples 4 through 6 and further includes receiving, by the at least one processor, a request to establish a communication session between the physical image capture device and at least one remote device of the plurality of remote devices, wherein initiating operation of the virtual device and the SFU comprises initiating operation of the virtual device and the SFU in response to receiving the request.

Example 8 includes the method of any of examples 4 through 7, wherein the plurality of audio streams comprises a plurality of audio tracks; and mixing, by the virtual device, the plurality of audio streams into a single audio stream includes implementing an audio processing pipeline comprising a mixer, generating a muted audio track, communicating the muted audio track to the mixer, and communicating the plurality of audio tracks to the mixer subsequent to communication of the muted audio track to the mixer.

Example 9 includes the method of any of examples 4 through 8 and further includes establishing, by the SFU, a virtual room; and joining, by the virtual device, the virtual room on behalf of the physical image capture device.

Example 10 includes the method of example 9 and further includes acquiring, by the physical image capture device, the audiovisual stream; transmitting, by the physical image capture device, the audiovisual stream to the virtual device; receiving, by the physical image capture device, the single audio stream; and rendering, by the physical image capture device, the single audio stream as audio.

Example 11 includes the method of example 10 and further includes joining, by at least one remote device of the plurality of remote devices, the virtual room; acquiring, by the at least one remote device of the plurality of remote devices, at least one audio stream from the plurality of audio streams; transmitting, by the at least one remote device of the plurality of remote devices, the at least one audio stream to the virtual room; receiving, by the at least one remote device of the plurality of remote devices, at least one other audio stream from the plurality of audio streams; receiving, by the at least one remote device of the plurality of remote devices, the audiovisual stream; mixing, by the at least one remote device of the plurality of remote devices, audio tracks encapsulated within the at least one other audio stream and the audiovisual stream to generate a mixed track; and rendering, by the at least one remote device of the plurality of remote devices, the mixed track in lip synchrony with video encapsulated within the audiovisual stream.

Example 12 includes the method of example 11 and further includes hosting, by one or more computing devices of the plurality of remote devices, one or more of a customer interface or a monitor interface.

Example 13 includes the method of example 12, wherein communicating the single audio stream comprises communicating the single audio stream to a security camera.

It should be noted that, in any of the examples 1 and 4-13, the virtual device may be or include a virtual camera.

Example 14 is a system including a computing environment including at least one network interface, and at least one processor coupled with the at least one network interface and configured to initiate operation of a virtual device and a selective forwarding unit (SFU) and, the virtual device being configured to receive a plurality of audio streams from the SFU, mix the plurality of audio streams into a single audio stream, communicate the single audio stream to an physical image capture device, and receive an audiovisual stream from the physical image capture device.

Example 15 is a system including a computing environment. The computing environment includes at least one network interface, and at least one processor coupled with the at least one network interface. The at least one processor is configured to initiate operation of a virtual camera configured to receive a plurality of audio streams, mix the plurality of audio streams into a single audio stream, and communicate the single audio stream to a physical image capture device.

Example 16 includes the system of example 15, wherein the at least one processor is further configured to initiate operation of a selective forwarding unit (SFU) configured to: receive the plurality of audio streams originating from the plurality of remote devices; and communicate the plurality of audio streams to the virtual device, wherein to receive, by the virtual camera, the plurality of audio streams includes to receive, by the virtual camera, the plurality of audio streams from the SFU.

Example 17 includes the system of either example 14 or example 16, wherein the virtual device is configured to communicate the audiovisual stream to the SFU; and the SFU is configured to receive the audiovisual stream from the virtual device, communicate the audiovisual stream to a plurality of remote devices, receive the plurality of audio streams from the plurality of remote devices, and communicate the plurality of audio streams to the virtual device.

Example 18 includes the system of example 17, wherein the at least one processor is configured to initiate operation of the virtual device and the SFU in response to reception of a request to establish a communication session between the physical image capture device and at least one remote device of the plurality of remote devices.

Example 19 includes the system of any one of examples 14, 16, 17, or 18, wherein individual streams of the plurality of audio streams, the single audio stream, and the audiovisual stream comprise real-time protocol (RTP) packets.

Example 20 includes the system of any of examples 14, 16, 17, 18, or 19, wherein the plurality of audio streams comprises a plurality of audio tracks; and to mix the plurality of audio streams comprises to implement an audio processing pipeline comprising a mixer; generate a muted audio track; communicate the muted audio track to the mixer; and communicate the plurality of audio tracks to the mixer subsequent to communication of the muted audio track to the mixer.

Example 21 includes the system of any of examples 17 through 20, wherein the SFU is further configured to establish a virtual room; and the virtual device is configured to join the virtual room on behalf of the physical image capture device.

Example 22 includes the system of example 21 and further includes the physical image capture device, wherein the physical image capture device is configured to acquire the audiovisual stream; transmit the audiovisual stream to the virtual device; receive the single audio stream; and render the single audio stream as audio.

Example 23 includes the system of example 22 and further includes the plurality of remote devices, at least one remote device of the plurality of remote devices being configured to join the virtual room; acquire at least one audio stream from the plurality of audio streams; transmit the at least one audio stream to the virtual room; receive at least one other audio stream from the plurality of audio streams; receive the audiovisual stream; mix audio tracks encapsulated within the at least one other audio stream and the audiovisual stream to generate a mixed track; and render the mixed track in lip synchrony with video encapsulated within the audiovisual stream.

Example 24 includes the system of example 23, wherein the plurality of remote devices comprises one or more computing devices configured to host one or more of a customer interface or a monitor interface.

Example 25 includes the system of example 24, wherein the physical image capture device comprises a security camera.

Example 26 includes the system of any one of examples 14, 16, 17, 18, 19, 20, or 21, wherein by the virtual device is further configured to receive an audiovisual stream from the physical image capture device.

It should be noted that, in any of the examples 14 and 16-26, the virtual device may be or include a virtual camera.

In some examples, the SFU described herein is replaced with a multipoint control unit (MCU). In these examples, the customer interfaces, monitor interfaces, and virtual device may receive respective mixed tracks from the MCU and, therefore, these individual receiving processes may only need to handle a single, mixed track. Examples that utilize an MCU further centralize media processing vis-à-vis examples that utilize an SFU. This centralization may be beneficial or detrimental, depending on the capabilities of the devices hosting the receiving processes. For instance, if the devices hosting the customer and monitor interfaces have sufficient computing resources to mix and render the media streams without noticeable problems, then the SFU-based examples may be preferrable due to their ability to scale the number of virtual conference sessions without requiring as much centralized computing resources as MCU-based examples.

In certain examples, the camera agent 138 is replaced by another local agent, such as the DCS code described above with reference to FIG. 6.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:

initiating, by at least one processor, operation of a virtual camera having allocated processing resources within a computing environment;

initiating operation of a selective forwarding unit (SFU) within the computing environment;
communicating, by the SFU, a plurality of audio streams from a plurality of audio devices to the virtual camera;
receiving, by the virtual camera, the plurality of audio streams from the SFU;
mixing, by the virtual camera, the plurality of audio streams into a single audio stream; and
communicating, by the virtual camera, the single audio stream to a physical image capture device at a remote location.

2. The method of claim 1, further comprising:
receiving, by the at least one processor, a request to establish a communication session between the physical image capture device and at least one remote device of a plurality of remote devices, wherein initiating operation of the virtual camera and the SFU comprises initiating operation of the virtual camera and the SFU in response to receiving the request.

3. The method of claim 1, wherein:
the plurality of audio streams comprises a plurality of audio tracks; and
mixing, by the virtual camera, the plurality of audio streams into a single audio stream comprises
implementing an audio processing pipeline comprising a mixer,
generating a muted audio track,
communicating the muted audio track to the mixer, and
communicating the plurality of audio tracks to the mixer subsequent to communication of the muted audio track to the mixer.

4. The method of claim 1, further comprising receiving, by the virtual camera, an audiovisual stream from the physical image capture device.

5. The method of claim 4, further comprising:
communicating, by the virtual camera, an audiovisual stream to the SFU;
receiving, by the SFU, the audiovisual stream from the virtual camera; and
communicating, by the SFU, the audiovisual stream to a plurality of remote devices.

6. The method of claim 5, wherein:
receiving the plurality of audio streams comprises receiving a first plurality of real-time protocol (RTP) packets;
communicating the single audio stream comprises communicating a second plurality of RTP packets; and
receiving the audiovisual stream comprises receiving a third plurality of RTP packets.

7. The method of claim 4, further comprising:
establishing, by the SFU, a virtual room; and
joining, by the virtual camera, the virtual room on behalf of the physical image capture device.

8. The method of claim 7, further comprising:
acquiring, by the physical image capture device, the audiovisual stream;
transmitting, by the physical image capture device, the audiovisual stream to the virtual camera;
receiving, by the physical image capture device, the single audio stream; and
rendering, by the physical image capture device, the single audio stream as audio.

9. The method of claim 8, further comprising:
joining, by at least one remote device of a plurality of remote devices, the virtual room;
acquiring, by the at least one remote device of the plurality of remote devices, at least one audio stream from the plurality of audio streams;
transmitting, by the at least one remote device of the plurality of remote devices, the at least one audio stream to the virtual room;
receiving, by the at least one remote device of the plurality of remote devices, at least one other audio stream from the plurality of audio streams;
receiving, by the at least one remote device of the plurality of remote devices, the audiovisual stream;
mixing, by the at least one remote device of the plurality of remote devices, audio tracks encapsulated within the at least one other audio stream and the audiovisual stream to generate a mixed track; and
rendering, by the at least one remote device of the plurality of remote devices, the mixed track in lip synchrony with video encapsulated within the audiovisual stream.

10. The method of claim 9, further comprising hosting, by one or more computing devices of the plurality of remote devices, one or more of a customer interface or a monitor interface.

11. The method of claim 10, wherein communicating the single audio stream comprises communicating the single audio stream to a security camera.

12. A system comprising:
a computing environment comprising at least one network interface, and
at least one hardware processor coupled with the at least one network interface and configured to:
initiate operation of a virtual camera with allocated processing resources configured to receive a plurality of audio streams, mix the plurality of audio streams into a single audio stream, and communicate the single audio stream to a physical image capture device;
initiate operation of a selective forwarding unit (SFU) configured to receive the plurality of audio streams originating from a plurality of remote devices; and
communicate the plurality of audio streams to the virtual camera, wherein to receive, by the virtual camera, the plurality of audio streams includes to receive, by the virtual camera, the plurality of audio streams from the SFU.

13. The system of claim 12, wherein the virtual camera is further configured to:
receive an audiovisual stream from the physical image capture device; and
communicate the audiovisual stream to the SFU.

14. The system of claim 13, wherein the SFU is configured to:
receive the audiovisual stream from the virtual camera,
communicate the audiovisual stream to a plurality of remote devices,
receive the plurality of audio streams from the plurality of remote devices, and
communicate the plurality of audio streams to the virtual camera.

15. The system of claim 13, wherein individual streams of the plurality of audio streams, the single audio stream, and the audiovisual stream comprise real-time protocol (RTP) packets.

16. The system of claim 13, wherein:
the SFU is further configured to establish a virtual room; and
the virtual camera is configured to join the virtual room on behalf of the physical image capture device.

17. The system of claim 16, further comprising the physical image capture device, wherein the physical image capture device is configured to:

acquire the audiovisual stream;
transmit the audiovisual stream to the virtual camera;
receive the single audio stream; and
render the single audio stream as audio.

18. The system of claim 17, further comprising the plurality of remote devices, at least one remote device of the plurality of remote devices being configured to:
join the virtual room;
acquire at least one audio stream from the plurality of audio streams;
transmit the at least one audio stream to the virtual room;
receive at least one other audio stream from the plurality of audio streams;
receive the audiovisual stream;
mix audio tracks encapsulated within the at least one other audio stream and the audiovisual stream to generate a mixed track; and
render the mixed track in lip synchrony with video encapsulated within the audiovisual stream.

19. The system of claim 12, wherein the at least one hardware processor is configured to initiate operation of the virtual camera and the SFU in response to reception of a request to establish a communication session between the physical image capture device and at least one remote device of the plurality of remote devices.

20. The system of claim 12, wherein:
the plurality of audio streams comprises a plurality of audio tracks; and
to mix the plurality of audio streams comprises to
implement an audio processing pipeline comprising a mixer;
generate a muted audio track;
communicate the muted audio track to the mixer; and
communicate the plurality of audio tracks to the mixer subsequent to communication of the muted audio track to the mixer.

* * * * *